(12) United States Patent
Hasegawa

(10) Patent No.: US 10,371,941 B2
(45) Date of Patent: Aug. 6, 2019

(54) LIGHT BEAM SCANNING DEVICE SUPPRESSING THERMAL DEFORMATION OF A SCANNING LENS AND IMAGE FORMING DEVICE

(71) Applicant: Konica Minolta, Inc., Tokyo (JP)

(72) Inventor: Ryo Hasegawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/729,032

(22) Filed: Oct. 10, 2017

(65) Prior Publication Data

US 2018/0113299 A1 Apr. 26, 2018

(30) Foreign Application Priority Data

Oct. 21, 2016 (JP) ................. 2016-206708

(51) Int. Cl.
*G03G 15/00* (2006.01)
*G02B 26/12* (2006.01)
*G02B 7/02* (2006.01)
*G03G 15/04* (2006.01)

(52) U.S. Cl.
CPC ........... *G02B 26/125* (2013.01); *G02B 7/028* (2013.01); *G02B 26/121* (2013.01); *G03G 15/0409* (2013.01); *G03G 15/04072* (2013.01)

(58) Field of Classification Search
CPC .................................................. G02B 26/125
USPC ............................................................. 399/4
See application file for complete search history.

(56) References Cited

U.S. PATENT DOCUMENTS

| | | | | |
|---|---|---|---|---|
| 5,499,045 A | * | 3/1996 | Takeshita | B41J 2/471 347/257 |
| 2004/0240083 A1 | * | 12/2004 | Yamakawa | G02B 7/025 359/811 |
| 2005/0094234 A1 | * | 5/2005 | Miyatake | B41J 2/473 359/220.1 |

FOREIGN PATENT DOCUMENTS

| | | |
|---|---|---|
| JP | 2004118122 A | 4/2004 |
| JP | 2005262596 A | 9/2005 |

* cited by examiner

*Primary Examiner* — Quana Grainger
(74) *Attorney, Agent, or Firm* — Lucas & Mercanti, LLP

(57) ABSTRACT

A light beam scanning device deflecting, by using a rotating polygon mirror, a light beam emitted from a light source and condensing, by using a scanning lens, the deflected light beam onto a scanned surface. The light beam scanning device includes: a base made of a metal or a resin; a motor unit attached to the base and rotating the polygon mirror; a holding member holding the scanning lens; and one or more fixing members disposed between the base and the holding member, fixing the holding member to the base with the scanning lens spaced away from the base. In the light beam scanning device, the base has, between at least one of the fixing members and the motor unit, a penetrating hole or groove around which heat transmitted from the motor unit through the base to the fixing member passes.

20 Claims, 11 Drawing Sheets

FIG. 6A

| Lens posture change direction | | | Optical performance | | | | | | | | | | | | |
|---|---|---|---|---|---|---|---|---|---|---|---|---|---|---|---|
| | | | Sub image surface | | | Main image surface | | | Sub position | | | Main position | | |
| | | | Shift | Bias | Curvature | Shift | Bias | Curvature | Shift | Bias | Curvature | Shift | Bias | Curvature |
| When each optical lens undergoes posture change | Optical lens 1 | X movement | 0.00 | 0.01 | 0.01 | 0.59 | 0.07 | -0.23 | 0.00 | 0.00 | 0.00 | 0.00 | -0.48 | 0.00 |
| | | Y movement | 0.00 | -0.01 | 0.00 | 0.03 | -1.22 | 0.01 | 0.00 | 0.00 | 0.00 | -0.24 | 0.00 | 0.02 |
| | | Z movement | 0.00 | 0.00 | 0.00 | 0.00 | 0.00 | 0.00 | 0.00 | 0.00 | 0.00 | 0.00 | 0.00 | 0.00 |
| | | X rotation | 0.00 | 0.00 | 0.00 | 0.00 | 0.00 | 0.00 | 0.00 | 0.00 | 0.00 | 0.00 | 0.00 | 0.00 |
| | | Y rotation | 0.00 | 0.00 | 0.00 | 0.00 | 0.00 | 0.00 | 0.00 | -0.01 | 0.00 | 0.00 | 0.00 | 0.12 |
| | | Z rotation | 0.00 | -0.02 | 0.00 | 0.02 | 3.97 | -0.04 | 0.00 | 0.00 | 0.00 | -0.01 | -0.02 | 0.00 |
| | Optical lens 2 | X movement | 0.00 | 0.00 | -0.01 | -0.52 | -0.06 | 0.29 | 0.00 | 0.00 | 0.00 | 0.00 | 0.36 | 0.00 |
| | | Y movement | 0.00 | 0.00 | 0.00 | -0.02 | 0.87 | -0.01 | 0.00 | 0.00 | 0.00 | 0.16 | 0.00 | -0.01 |
| | | Z movement | 0.00 | 0.00 | 0.00 | 0.00 | 0.00 | 0.00 | 0.00 | 0.00 | 0.00 | 0.00 | 0.00 | 0.00 |
| | | X rotation | 0.00 | 0.00 | 0.00 | 0.00 | 0.00 | 0.00 | 0.01 | 0.00 | 0.01 | 0.00 | 0.00 | 0.00 |
| | | Y rotation | 0.00 | 0.00 | 0.00 | 0.00 | 0.00 | 0.00 | 0.00 | 0.00 | 0.00 | 0.00 | 0.00 | 0.00 |
| | | Z rotation | 0.00 | 0.01 | -0.01 | -0.02 | -3.22 | 0.03 | 0.00 | 0.02 | 0.00 | 0.01 | 0.01 | -0.11 |
| | Optical lens 3 | X movement | 0.00 | 0.00 | 0.00 | 0.03 | -0.03 | -0.01 | 0.00 | 0.00 | 0.00 | 0.00 | 0.20 | 0.00 |
| | | Y movement | 0.00 | 0.00 | 0.00 | -0.06 | 0.12 | -0.03 | 0.00 | 0.03 | 0.00 | 0.18 | 0.00 | -0.01 |
| | | Z movement | 0.00 | 0.00 | 0.00 | 0.00 | 0.00 | -0.01 | 0.00 | 0.00 | 0.00 | 0.00 | 0.00 | 0.00 |
| | | X rotation | 0.00 | 0.00 | 0.00 | 0.00 | 0.00 | 0.00 | 0.01 | 0.00 | 0.01 | 0.00 | 0.00 | 0.00 |
| | | Y rotation | 0.00 | 0.00 | 0.00 | 0.00 | 0.00 | 0.00 | 0.00 | 0.00 | 0.00 | 0.00 | 0.00 | 0.00 |
| | | Z rotation | 0.00 | 0.01 | 0.00 | 0.04 | -0.68 | 0.02 | 0.00 | 0.00 | 0.01 | 0.03 | 0.00 | -0.08 |

FIG. 6B

| | X movement | -0.08 | 0.00 | -0.01 | 0.11 | -0.01 | 0.03 | 0.00 | 0.00 | 0.00 | 0.00 | 0.08 | 0.00 |
|---|---|---|---|---|---|---|---|---|---|---|---|---|---|
| When optical lenses are on holding plate | Y movement | 0.00 | 0.02 | 0.00 | -0.04 | -0.09 | -0.03 | 0.00 | 0.00 | 0.00 | 0.10 | 0.00 | 0.01 |
| | Z movement | 0.00 | 0.00 | 0.00 | 0.00 | 0.00 | 0.00 | 0.04 | 0.00 | 0.00 | 0.00 | 0.00 | 0.00 |
| | X rotation | 0.00 | 0.00 | 0.00 | 0.00 | 0.00 | 0.01 | 0.02 | -0.01 | 0.01 | 0.00 | 0.00 | 0.00 |
| | Y rotation | 0.00 | 0.00 | 0.00 | 0.00 | 0.00 | 0.00 | 0.00 | 0.00 | 0.00 | 0.00 | 0.00 | 0.00 |
| | Z rotation | 0.00 | -0.09 | 0.00 | 0.03 | 0.13 | 0.01 | 0.00 | 0.00 | 0.00 | 0.04 | 0.00 | -0.07 |

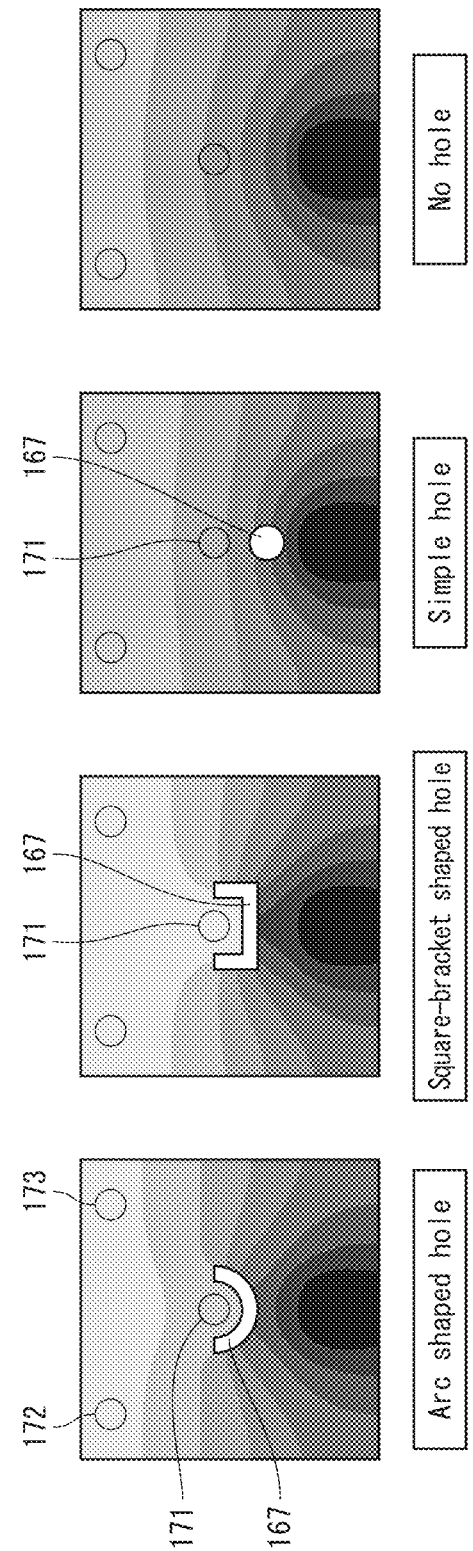

LIGHT BEAM SCANNING DEVICE SUPPRESSING THERMAL DEFORMATION OF A SCANNING LENS AND IMAGE FORMING DEVICE

Japanese Patent Application No. 2016-206708 filed on Oct. 21, 2016, including description, claims, drawings, and abstract, is incorporated herein by reference in its entirety.

BACKGROUND

Technical Field

The present invention relates to a light beam scanning device deflecting, by a polygon mirror, a light beam emitted from a light source and condensing, by a scanning lens, the deflected light beam onto a scanned surface.

Description of the Related Art

For example, in electrophotographic printers and copiers, an image is formed through causing a circumferential surface of a photoreceptor drum to be exposed to and scanned by a light beam from a light beam scanning device to form an electrostatic latent image, developing the electrostatic latent image into a toner image, and transferring the toner image onto a recording sheet.

For example, some light beam scanning devices cause a light beam emitted from a light source such as a semiconductor laser to be incident on a deflection surface of a polygon mirror rotated by a polygon motor and to deflect within a predetermined range of a scanning angle, so that the light beam after deflection is condensed by a scanning lens onto a circumferential surface of a photoreceptor drum and the circumferential surface of the photoreceptor drum is exposed to and scanned by the light beam in a main scanning direction. In such a light beam scanning device, the polygon motor and the scanning lens are typically mounted directly onto a bottom surface of a housing of the light beam scanning device.

Recently, an increase in a scanning speed of the light beam through rotating the polygon mirror at a higher speed is required due to demand for an increase in printing speeds and improved resolution of formed images. One possible measure for rotating the polygon mirror at a higher speed is to increase a rotational frequency of the polygon motor.

However, when the rotational frequency of the polygon motor is increased, the polygon motor discharges a greater amount of heat. The heat is transmitted through the housing to the scanning lens and may cause thermal deformation of the scanning lens.

Specifically when a housing made of a metal such as die-cast aluminum is used in order to improve positioning accuracy of members including the scanning lens, heat of the polygon motor is likely to be transmitted to the scanning lens due to high thermal conductivity of such a material. A similar phenomenon may also occur with a housing made of a resin having a relatively high thermal conductivity.

When a scanning lens undergoes thermal deformation, a position on the photoreceptor drum at which a light beam after passing through the scanning lens is emitted may be removed from its original position before the thermal deformation, or a light amount emitted onto the photoreceptor drum may change. These phenomena may lead to image quality deterioration.

Regarding the phenomenon of heat of the polygon motor being transmitted through the housing to the scanning lens, Japanese Patent Application Publication No. 2004-118122, for example, discloses a structure including many holes or grooves distributed throughout the whole region of a bottom surface of the housing from the polygon motor to the scanning lens. However, the many holes or grooves aim at equalizing, in a longitudinal direction of the scanning lens (equivalent with the main scanning direction), a heat amount transmitted from the polygon motor to the scanning lens, and the heat of the polygon motor is nevertheless transmitted through the housing directly to the scanning lens. Accordingly, the structure of Japanese Patent Application Publication No. 2004-118122 cannot suppress thermal deformation of the scanning lens due to heat of the polygon motor.

SUMMARY

The present invention aims at providing a light beam scanning device and an image forming device in which thermal deformation of the scanning lens is suppressed even when the polygon mirror is rotated at a high speed.

To achieve at least one of the abovementioned objects, a light beam scanning device reflecting one aspect of the present invention deflecting, by using a rotating polygon mirror, a light beam emitted from a light source and condensing, by using a scanning lens, the deflected light beam onto a scanned surface, the light beam scanning device includes: a base made of a metal or a resin; a motor unit attached to the base and rotating the polygon mirror; a holding member holding the scanning lens; and one or more fixing members disposed between the base and the holding member, fixing the holding member to the base with the scanning lens spaced away from the base. In the light beam scanning device, the base has, between at least one of the fixing members and the motor unit, a penetrating hole or groove around which heat transmitted from the motor unit through the base to the fixing member passes.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention.

In the drawings:

FIG. 6A illustrates optical performance when thermal deformation occurs in a structure in which scanning lenses are directly fixed onto a base, and FIG. 6B illustrates optical performance when thermal deformation occurs to a holding plate in a structure in which scanning lenses are fixed onto the holding plate;

FIG. 9 illustrates temperature distribution of the base of the device housing;

DETAILED DESCRIPTION OF EMBODIMENTS

Hereinafter, one or more embodiments of the present invention will be described with reference to the drawings. However, the scope of the invention is not limited to the disclosed embodiments.

The following describes examples in which embodiments of an image forming device including a light beam scanning device pertaining to the present invention are each applied to a tandem-type color printer (hereinafter referred to as "printer").

Embodiment 1

<Overall Structure of Image Forming Device>

Figure 1:
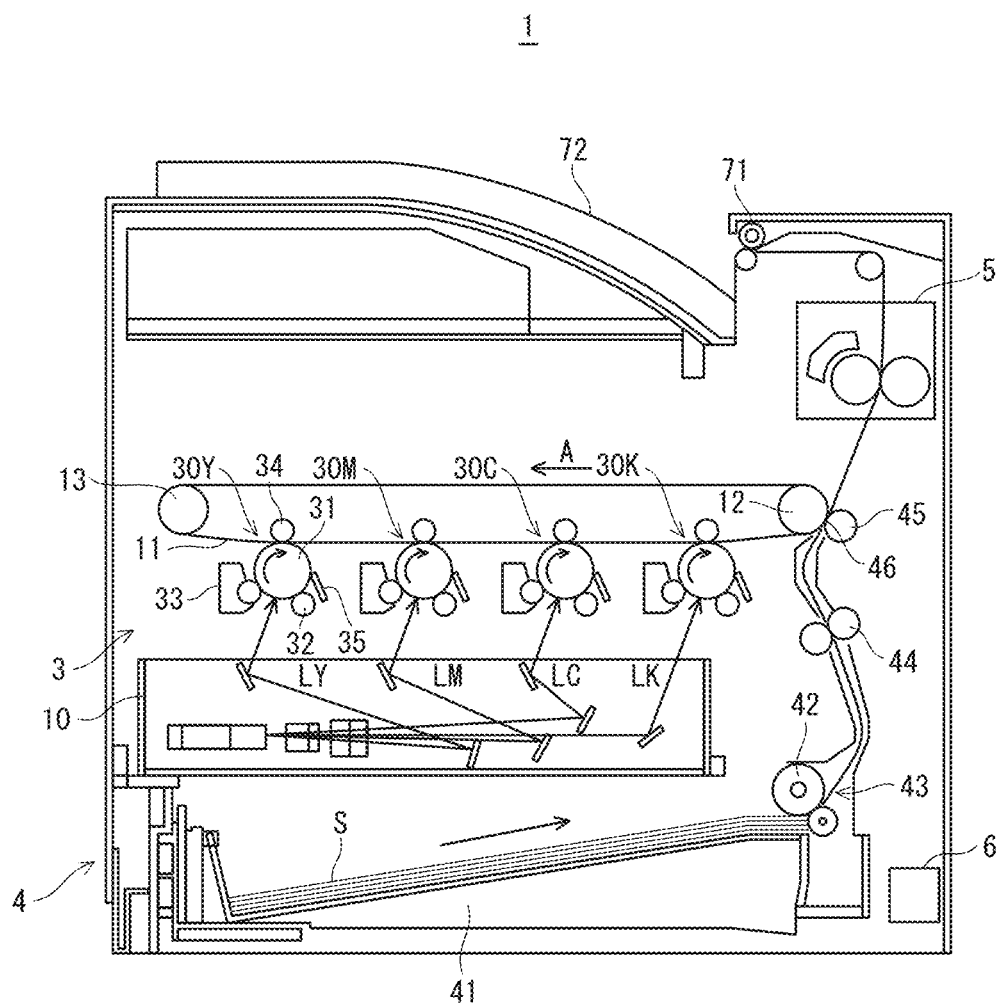
FIG. 1 is a schematic view illustrating a structure of a printer pertaining to Embodiment 1.

FIG. 1 is a schematic view illustrating a structure of a printer 1.

As illustrated in FIG. 1, the printer 1 includes an image processing unit 3, a sheet feed unit 4, a fixing unit 5, and a control unit 6. The printer 1 is connected to a network (such as a local area network (LAN)), and upon receiving a print job execution instruction from an external terminal device (not illustrated), forms toner images each consisting of a different one of colors yellow, magenta, cyan, and black on the basis of the instruction and forms a full-color image by transferring the toner images (multiple transfer).

In the following, reproduction colors yellow, magenta, cyan, and black are respectively represented as Y, M, C, and K, and the letters Y, M, C, and K are respectively annexed to reference numbers of components related to the four colors.

The image processing unit 3 includes components such as image forming units 30Y, 30M, 30C, and 30K respectively corresponding to the colors Y, M, C, and K, a light scanning unit 10 (light beam scanning device), and an intermediate transfer belt 11.

The image forming unit 30Y includes a photoreceptor drum 31 (scanning target) and components surrounding the photosensitive drum 31, such as a charging unit 32, a developing unit 33, a primary transfer roller 34, and a cleaner 35 for cleaning the photoreceptor drum 31.

The image forming unit 30Y forms a toner image of the Y color on the photoreceptor drum 31. Other image forming units 30M, 30C, and 30K have a structure similar to the image forming unit 30Y, and reference numbers thereof are not provided in FIG. 1.

The intermediate transfer belt 11 is an endless belt that is suspended with tension between a driving roller 12 and a driven roller 13 and is rotated and driven in a direction indicated by an arrow A.

As described in the following, the light scanning unit 10 includes laser diodes that are each a light source emitting a light beam of a different one of the colors Y, M, C, and K. When forming a full-color image, the light scanning unit 10 emits laser light beams LY, LM, LC, and LK for forming images of the colors Y, M, C, and K, respectively, in accordance with a drive signal from the control unit 6. This causes surfaces of the photoreceptor drums 31 of the image forming units 30Y, 30M, 30C, and 30K to be exposed to and scanned by the laser light beams LY, LM, LC, and LK, respectively, in a main scanning direction (direction parallel with the central axes of the photoreceptor drums 31).

Such light exposure and scanning causes, for each of the image forming units 30Y, 30M, 30C, and 30K, an electrostatic latent image to be formed on the photoreceptor drum 31 charged by the charging unit 32. Then the electrostatic latent image is developed by the developing unit 33, and a toner image of a corresponding color is formed on the photoreceptor drum 31.

Image forming operations at the image forming units 30Y, 30M, 30C, and 30K are performed at timings differing from each other by a predetermined time amount. The toner images that the image forming units 30Y, 30M, 30C, and 30K respectively form on their corresponding photoreceptor drums 31 are sequentially transferred to the same position on the intermediate transfer belt 11 by electrostatic forces of the primary transfer rollers 34, and a full-color toner image is formed.

Meanwhile, the sheet feed unit 4 includes components such as a sheet feed cassette 41 for housing recording sheets S, a pickup roller 42 for picking up a recording sheet S in the sheet feed cassette 41 and feeding the recording sheet S to a conveyance path 43, and a timing roller pair 44 driven according to a timing at which the recording sheet S is conveyed to a secondary transfer position 46.

The sheet feed unit 4 conveys a recording sheet S to the secondary transfer position 46 in accordance with a timing of movement of the toner image on the intermediate transfer belt 11, and the full-color toner image on the intermediate transfer belt 11 is transferred onto the recording sheet S due to an operation of the secondary transfer roller 45.

The recording sheet S, after passing through the secondary transfer position 46, is conveyed to the fixing unit 5. The toner image (unfixed image) on the recording sheet S is fixed to the recording sheet S through heat and pressure at the fixing unit 5. The recording sheet S is ejected by an ejection roller pair 71 onto an ejection tray 72.

<Structure of Light Scanning Unit>

Figure 2A:
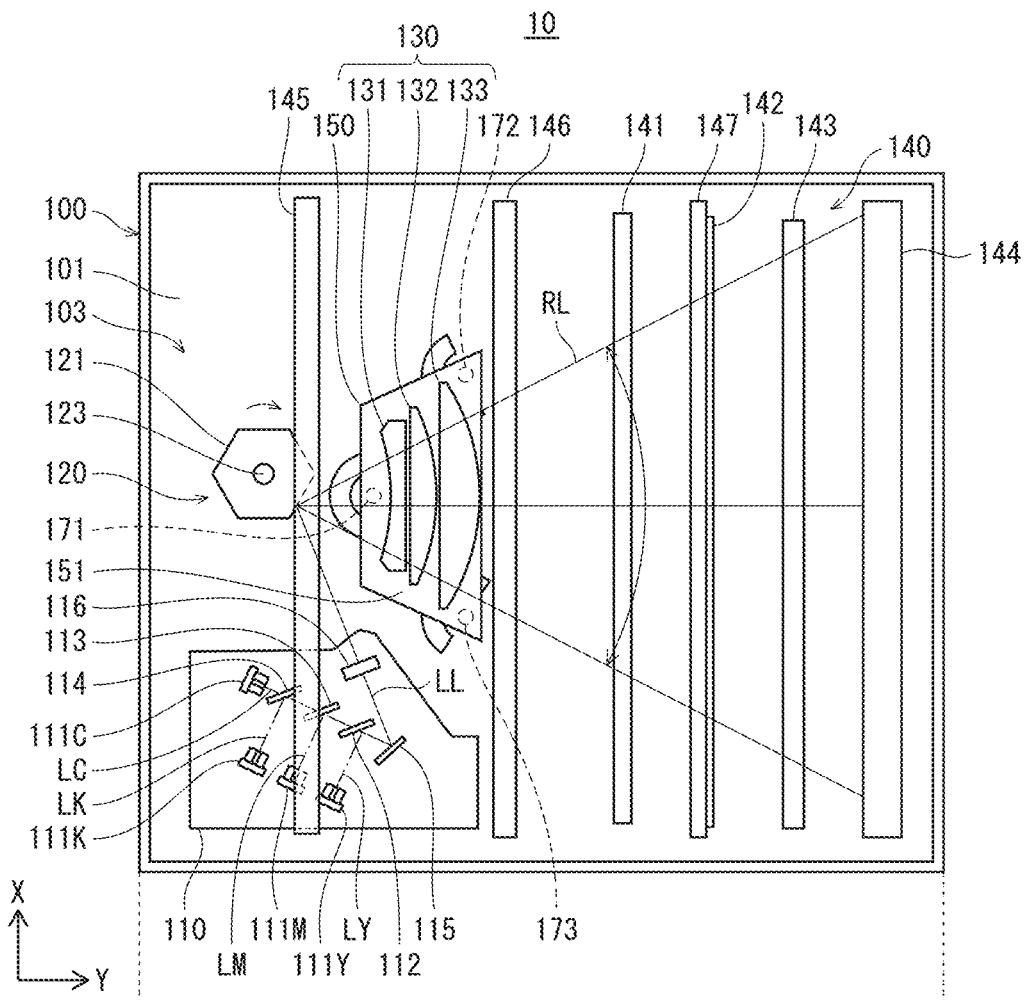
FIG. 2A is a plan view illustrating main components of a light scanning unit.
Figure 2B:
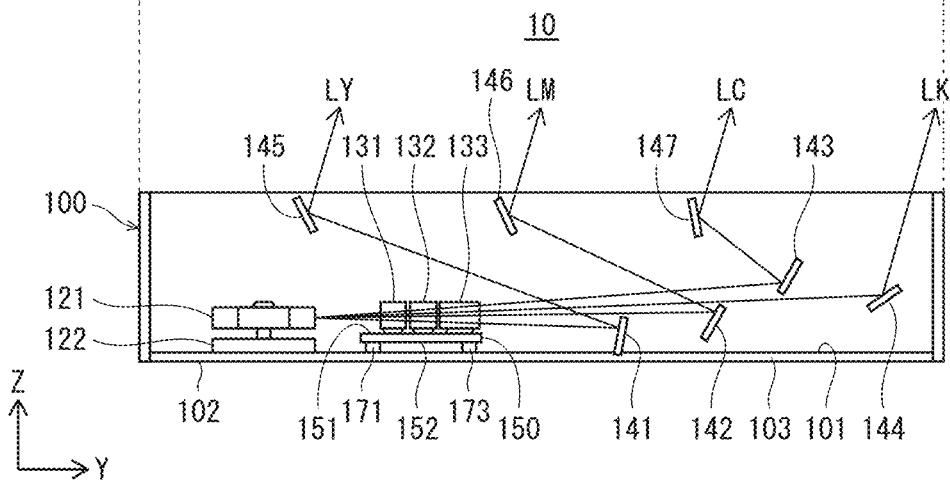
FIG. 2B is an elevation view corresponding to FIG. 2A.

FIG. 2A is a plan view illustrating a structure of main components of the light scanning unit 10, and FIG. 2B is an elevation view corresponding to FIG. 2A. In order to clearly show the inner structure thereof, FIG. 2A is illustrated as a view after removal of a top surface of a device housing 100, and FIG. 2B is illustrated as a view after removal of a side surface of the device housing 100. Note that a light source unit 110 shown in FIG. 2A is not illustrated in FIG. 2B. In the following, an X-axis direction illustrated in FIG. 2A is referred to as a main scanning direction. Further, the terms "left" and "right" are used relative to a Y-axis direction illustrated in FIG. 2A, and the terms "upper" and "lower" are used relative to a Z-axis direction illustrated in FIG. 2B.

As illustrated in FIG. 2A, the light scanning unit 10 includes the device housing 100, the light source unit 110, a light deflecting unit 120 including a polygon mirror 121, a scanning lens group 130, a reflection mirror group 140, and a holding plate 150 holding the scanning lens group 130.

The device housing 100 is made of die-cast aluminum and houses the light source unit 110, the light deflecting unit 120, the scanning lens group 130, the reflection mirror group 140, and the holding plate 150.

The light source unit 110 includes four semiconductor lasers (light sources) 111Y, 111M, 111C, and 111K, four mirrors 112, 113, 114, and 115, and a cylindrical lens 116.

The semiconductor lasers 111Y, 111M, and 111K emit laser light beams in the same direction and are arranged at equal intervals in a direction orthogonal to the light emission direction of the semiconductor lasers 111y, 111M, and 111K. The semiconductor laser 111C is arranged so that the light emission direction of the semiconductor laser 111C is orthogonal to the light emission direction of the semiconductor lasers 111y, 111M, and 111K.

Although not illustrated in FIG. 2A, the semiconductor lasers 111Y, 111M, 111C, and 111K have laser light beam emission apertures at different heights in a vertical direction (positions in the Z-axis direction in FIG. 2B). Due to this structure, a laser light beam LY emitted from the semiconductor laser 111Y, a laser light beam LM emitted from the semiconductor laser 111M, a laser light beam LC emitted from the semiconductor laser 111C, and a laser light beam LK emitted from the semiconductor laser 111K have optical paths at different heights.

The mirrors 112, 113, and 114 are respectively arranged in front of the emission apertures of the semiconductor lasers 111Y, 111M, and 111K, so that the mirrors 112, 113, and 114 only receives the laser light beams LY, LM, and LK, respectively.

The mirrors 112, 113, and 114 respectively reflect and deflect the laser light beam LY emitted from the semiconductor laser 111Y, the laser light beam LM emitted from the semiconductor laser 111M, and the laser light beam LK emitted from the semiconductor laser 111K at an angle of 90°. The mirror 115 is arranged so that the laser light beam LC emitted from the semiconductor laser 111C and the laser light beams LY, LM, and LK respectively reflected by the mirrors 112, 113, and 114 are reflected in the same direction. Heights of the mirrors 114, 113, and 112 in the vertical direction are lower in this order so that each of the reflected laser light beams LY, LM, and LK and the laser light beam LC does not interfere with mirrors other than its corresponding mirror before being incident on the mirror 115. The laser light beams LY, LM, LC, LK after reflection by the mirror 115 are collectively referred to as a laser light beam LL.

The cylindrical lens 116 directs the laser light beam LL reflected by the mirror 115 to the light deflecting unit 120. Specifically, the cylindrical lens 116 causes the laser light beam LL to be imaged on a reflective surface of the polygon mirror 121 in a rotational axis direction of the polygon mirror 121 (i.e. the Z-axis direction illustrated in FIG. 2B) and converts the laser light beam LL into a light beam parallel to a direction orthogonal to both the rotational axis direction of the polygon mirror 121 and a direction in which the laser light beam LL advances (i.e. direction parallel to the X-Y plane of FIG. 2A and orthogonal to the laser light beam LL).

The light deflecting unit 120 has the polygon mirror 121 and a polygon motor 122.

The polygon mirror 121 is a member having a shape of a prism (a hexagonal prism in the example in FIG. 2A) whose side surfaces are all reflective surfaces (mirror surfaces). The polygon motor 122 is a motor giving a rotary drive force to the polygon mirror 121 and causing the polygon mirror 121 to rotate about a rotational axis 123 of the polygon mirror 122 at a constant speed. The polygon motor 122 is attached to a plate-like base 103 forming a bottom portion of the device housing 100 by, for example, a screw. In the present embodiment, the rotational axis 123 of the polygon mirror 121 is equivalent with the rotational axis of the polygon motor 122 because the polygon mirror 121 is fixed at the rotational axis of the polygon motor 122.

Each of the reflective surfaces of the polygon mirror 121 reflects and deflects the laser light beam LL emitted from the light source unit 110 and changes an angle formed by the laser light beam LL and a reflected light beam RL, i.e. a deflection angle of the laser light beam LL, in accordance with rotation of the polygon mirror 121.

As illustrated in FIG. 2B, among the laser light beams LY, LM, LC, and LK forming the reflected light beam RL after being deflected by the polygon mirror 121, the laser light beam LC passes through the highest position in the upper-lower direction, and positions in the upper-lower direction through which the laser light beams LK, LM, and LY pass are lower in this order. This is because the laser light beams LY, LM, LC, and LK each have a different incident angle to the reflective surfaces of the polygon mirror 121, which are parallel with the rotational axis 123 of the polygon mirror 121.

The laser light beams LY, LM, LC, and LK, after being deflected by the polygon mirror 121, pass through scanning lenses 131, 132, and 133 included in the scanning lens group 130. The scanning lens 131 is a toroidal lens, and the scanning lenses 132 and 133 are each an aspherical lens. The scanning lenses 132 and 133 form an f-θ lens.

The scanning lenses 131 through 133 each have an elongated shape along the X-axis direction (corresponding to the scanning direction) and are fixed on and supported by an upper surface 151 (one main surface) of the trapezoidal holding plate 150.

The holding plate 150 is made of, for example, a metal or a resin. The holding plate 150 has a lower surface 152 (the other main surface) fixed to top portions of a plurality of columnar protrusions (three protrusions 171, 172, and 173 in the present embodiment) on an upper surface (hereinafter referred to as "bottom surface") 101 of the base 103 of the device housing 100 and is spaced away from and faces the bottom surface 101 of the device housing 100.

That is, the scanning lenses 131 through 133 are not directly fixed onto the bottom surface 101 of the device housing 100; the scanning lenses 131 through 133 are fixed to the upper surface 151 of the holding plate 150, which is spaced away from the bottom surface 101 through the protrusions 171 through 173 (two-storied structure).

Such a two-storied structure aims at preventing heat discharged from the polygon motor 122 during job execution from being transmitted from the bottom surface 101 of the device housing 100 directly to the scanning lenses 131 through 133 and causing thermal deformation of the scanning lenses 131 through 133.

The scanning lenses 131 through 133 each have optical power in both the main scanning direction and a sub scanning direction, and cause the laser light beams LY, LM, LC, and LK passing through the scanning lenses 131 through 133 to be imaged on their corresponding photoreceptor drums 31 through the reflection mirror group 140. This causes imaging points on the photoreceptor drums 31 to be exposed to light.

The reflection mirror group 140 includes primary reflection mirrors 141, 142, 143, and 144 and secondary reflection mirrors 145, 146, and 147. The primary reflection mirrors 141, 142, 143, and 144 respectively reflect the laser light beams LY, LM, LC, and LK after passing through the scanning lenses 131 through 133 (primary reflection). Then the secondary reflection mirrors 145, 146, and 147 respectively reflect the laser light beams LY, LM, and LC after the primary reflection by the primary reflection mirrors 141, 142, and 143, and each of the laser light beams LY, LM, LC, and LK after being reflected by the secondary reflection mirrors 145, 146, and 147 proceeds toward its corresponding photoreceptor drum 31 (FIG. 1) (secondary reflection). Only the primary reflection mirror 144 reflects the laser light beam LK that is incident on the primary reflection mirror 144 directly toward the photoreceptor drum 31.

As described above, the laser light beams LY, LM, LC, and LK respectively emitted from the semiconductor lasers 111Y, 111M, 111C, and 111K are deflected by the polygon mirror 121. After passing through the scanning lenses 131 through 133, the laser light beams LY, LM, LC, and LK respectively irradiate the photoreceptor drums 31 of the image forming units 30Y, 30M, 30C, and 30K through the reflection mirror group 140. This causes the photoreceptor drums 31 of the image forming units 30Y, 30M, 30C, and 30K to be each exposed to and scanned by a laser light beam along the main scanning direction, which is an axial direction of the photoreceptor drums.

<Details of Positional Relationship Between Holding Plate, Scanning Lenses, and Bottom Surface of Device Housing>

Figure 3:
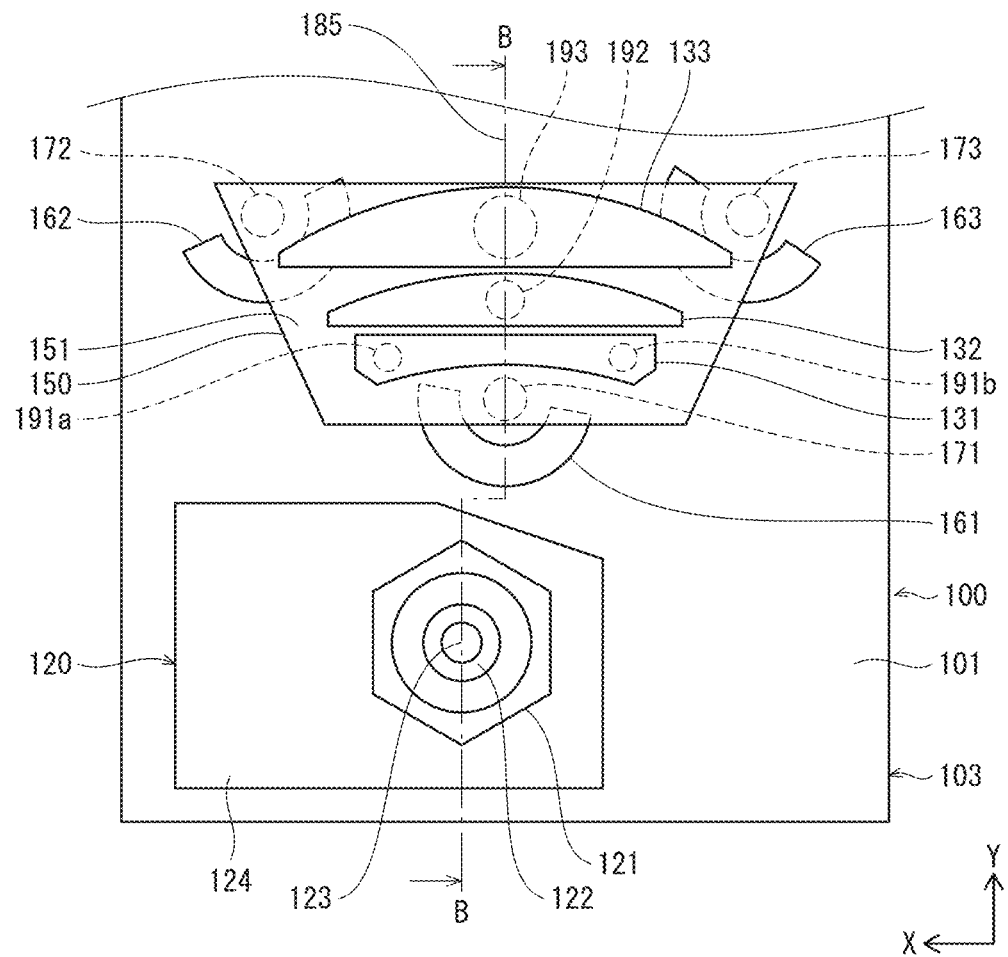
FIG. 3 is an enlarged plan view illustrating a positional relationship between a device housing, a light deflecting unit, a holding plate, and scanning lenses.
Figure 4:
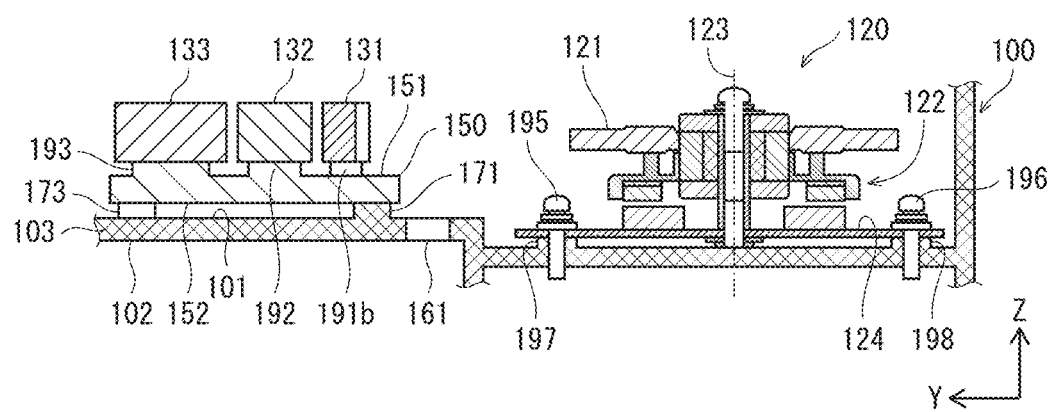
FIG. 4 is a cross-sectional view taken along line B-B in FIG. 3.

FIG. 3 is an enlarged plan view illustrating a positional relationship between the device housing 100, the light deflecting unit 120, the holding plate 150, and the scanning lenses 131 through 133. Members irrelevant to the following description are not illustrated in FIG. 3. FIG. 4 is a cross-sectional view taken along line B-B in FIG. 3, and FIG. 5 is an enlarged plan view illustrating a state after removal of the holding plate 150 in FIG. 3.

Figure 5:
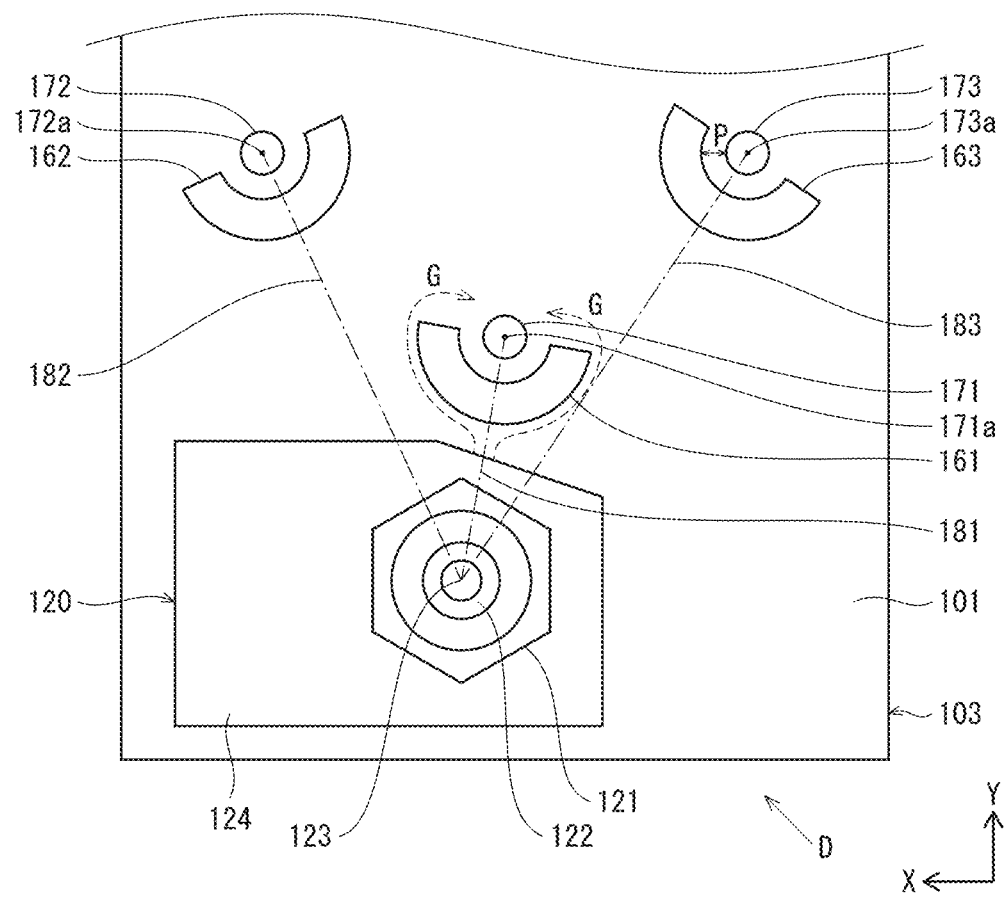
FIG. 5 is an enlarged plan view illustrating a state after removal of the holding plate in FIG. 3.

As illustrated in FIG. 3, FIG. 4, and FIG. 5, the polygon motor 122 is structured on a motor substrate 124 supplying electricity to the polygon motor 122, and the polygon motor 122 and the motor substrate 124 are considered as a single structure. The polygon motor 122 is fixed to the device housing 100 through being fastened to pedestals 197 and 198 at the bottom surface 101 of the device housing 100 by screws 195 and 196. When the polygon motor 122 and the motor substrate 124 are considered as a single structure as described above, the single structure is a motor unit that rotates and drives the polygon mirror 121. Meanwhile, when a polygon motor is fixed to the device housing 100 independently from the motor substrate 124, the polygon motor itself is a motor unit.

The holding plate 150 is supported at three positions by the three protrusions 171 through 173 on the base 103 of the device housing 100 in a horizontal orientation while being spaced away from the bottom surface 101. Although not illustrated in FIG. 3 through FIG. 5, the holding plate 150 is fixed by screws on the top portions of the protrusions 171 through 173. The holding plate 150 may not necessarily be fixed by screws, and may be, for example, adhered by adhesive or molded. The protrusions 171 through 173 are formed as a part of the device housing 100 made of die-cast aluminum when forming the device housing 100.

The upper surface 151 of the holding plate 150 has two protruding receiving portions (seat surfaces) 191a and 191b as supporting members for supporting the scanning lens 131 that are spaced away from each other in a longitudinal direction of the scanning lenses. The scanning lens 131 is fixed to and supported by the holding plate 150 due to the bottom surface of the scanning lens 131 being adhered by adhesive onto top portions of the receiving portions 191a and 191b at the upper surface 151 of the holding plate 150. Similarly, the scanning lens 132 is fixed to and supported by the holding plate 150 due to the bottom surface of the scanning lens 132 being adhered by adhesive onto a top portion of a protruding receiving portion 192 at the upper surface 151 of the holding plate 150. Further, the scanning lens 133 is fixed to and supported by the holding plate 150 due to the bottom surface of the scanning lens 133 being adhered by adhesive onto a top portion of a protruding receiving portion 193 at the upper surface 151 of the holding plate 150. The scanning lenses 131 though 133 may not necessarily be adhered by adhesive, and may be fixed to the holding plate 150 by other measures.

The two-storied structure in which the scanning lenses 131 through 133 are fixed on a holding plate 150, which is spaced away from the base 103 of the device housing 100 through the protrusions 171 through 173, has a greater effect in suppressing deterioration of optical performance due to thermal deformation than a structure in which the scanning lenses 131 through 133 are directly fixed onto the base 103 of the device housing 100.

FIG. 6A is a table of values indicating optical performance when thermal deformation occurs in a structure in which three scanning lenses are directly fixed onto a base, and FIG. 6B is a table of values indicating optical performance when thermal deformation occurs to a holding plate in a structure in which three scanning lenses are fixed onto the holding plate.

In FIG. 6A, an optical lens 1 is the scanning lens that is the closest to a polygon motor among optical lenses 1, 2, and 3, and the optical lens 3 is the farthest from the polygon motor. The three optical lenses each have optical power in both the main scanning direction and the sub scanning direction, in a manner similar to the scanning lenses 131 through 133.

Here, X movement refers to movement in a direction parallel to an optical axis of an optical lens, Y movement refers to movement in a direction parallel to the main scanning direction, and Z movement refers to movement in a direction parallel to the sub scanning direction. X rotation refers to rotation about an optical axis of an optical lens, Y rotation refers to rotation about an axis parallel to the main scanning direction, and Z rotation refers to rotation about an axis parallel to the sub scanning direction.

FIG. 6A illustrates optical performance of the optical lenses 1 through 3 when each of the optical lenses 1 through 3 undergoes X movement, Y movement, or Z movement by a distance of 0.1 mm from its original position (design position) or each of the optical lenses 1 through 3 undergoes X rotation, Y rotation, or Z rotation at five arcminutes from its original position (design position). These movements of the optical lenses by 0.1 mm and rotations of the optical lenses at five arcminutes are presupposed as orientations of optical lenses when thermal deformation occurs due to heat of the polygon motor.

"Sub image surface" in the optical performance column indicates a focus position in the sub scanning direction of an image condensed onto a scanned surface (i.e. a surface of a photoreceptor drum) in the sub scanning direction when the scanned surface is scanned by a laser light beam from a polygon mirror through a scanning lens. "Main image surface" indicates a focus position in the main scanning direction of an image condensed onto the scanned surface in the main scanning direction.

"Shift" indicates the amount of shift when overall positions of focus positions of images at positions from one end of the scanned surface in the main scanning direction to the other end of the scanned surface in the main scanning direction are removed from their original positions in an a direction. The a direction is one of the sub scanning direction and the main scanning direction. "Bias" indicates a difference between a shift amount in the a direction of a focus position of an image on the scanned surface at a center of the main scanning direction from the original position of the image at the center and a shift amount in the a direction of a focus position of an image on the scanned surface at an end of the main scanning direction from the original position of the image at the end. "Curvature" indicates an extent of curvature when a line connecting focus positions of images on the scanned surface from one end in the main scanning direction to the other end in the main scanning direction convexly curves in the a direction.

Specifically, when the optical lens 1 is moved from its original position by 0.1 mm in an optical axis direction (X movement), the shift of the sub image surface is zero. This indicates that, for the optical lens 1, overall positions of the focus positions of images on the scanned surface in the sub scanning direction from one end in the main scanning direction to the other end in the main scanning direction are equivalent with their original positions, i.e. the shift amount is zero. Similarly, the bias of the sub image surface is 0.01. This indicates that, for the optical lens 1, a difference between a sub scanning direction shift amount between a focus position of an image on the scanned surface at the center in the main scanning direction and the original position of the image at the center and a sub scanning direction shift amount between a focus position of an image on the scanned surface at an end in the main scanning direction and the original position of the image at the end is 0.01 mm. For other optical lenses, and for other parameters such as curvature, the data in FIG. 6 can be similarly interpreted.

The values include positive numbers and negative numbers in order to distinguish a direction to which the focus positions are removed by indicating, for example, positions above the original position as positive numbers and positions below the original position as negative numbers. The greater the absolute value, the greater the effect (sensitivity) of the deviation of the lens position on the optical performance.

"Sub position" indicates a position on the scanned surface in the sub scanning direction at which a laser light beam irradiated from the polygon mirror through the scanning lenses onto the scanned surface is irradiated, and "main position" indicates a position at which the laser light beam is irradiated on the scanned surface in the main scanning direction.

For example, when the optical lens 1 undergoes an X movement by 0.1 mm from its original position, the bias of the main position is "−0.48". This indicates that a difference between a main scanning direction shift amount of the irradiation position on the scanned surface at the center of the main scanning direction from its original irradiation position and a main scanning direction shift amount of the irradiation position on the scanned surface at an end of the main scanning direction from its original irradiation position is 0.48 mm.

Values indicating optical performance of the optical lenses 1 through 3 in FIG. 6A show that relatively great values (absolute values) are included in shifts and biases of the main image surface and the main position for the optical lenses 1 and 2, which are optical lenses close to the polygon mirror. FIG. 6A indicates optical performance results when the optical lenses 1 through 3 move independently from each other. Accordingly, these results are construed as being due to movement of an optical lens causing shift amounts relative to the other two optical lenses to increase and thus positions at the optical lenses through which laser light beams pass are greatly removed from their original positions. Quality of images formed on the scanned surface is likely to deteriorate to a greater extent when shifts, bias, and curvature occur to a greater extent.

Meanwhile, FIG. 6B illustrates optical performance when the holding plate, on which the optical lenses 1 through 3 are fixed, undergoes X movement, Y movement, or Z movement by 0.1 mm from its original position (design position) or undergoes X rotation, Y rotation, or Z rotation at five arcminutes from its original position (design position).

The values (absolute values) indicating optical performance of the optical lenses 1 through 3 illustrated in FIG. 6B are much smaller than the values (absolute values) in FIG. 6A. This is construed as being due to the optical lenses 1 through 3 not moving independently from each other but moving integrally at the same time. Accordingly, movement of an optical lens does not cause shift amounts relative to the other two optical lenses to increase as in FIG. 6A, and thus positions at the optical lenses through which the laser light beams pass are not greatly removed from their original positions.

The above simulation reveals that effects of thermal deformation of optical lenses due to heat of the polygon motor 122 is much smaller in the two-storied structure in which the optical lenses 1 through 3 are fixed on a holding plate than in a structure in which an optical lens is fixed directly onto the base 103.

Referring back to FIG. 3, a line segment 185 of line B-B that passes through the scanning lenses 131 through 133 in the Y-axis direction is a part of a straight line passing through the center position (lens center) of the scanning lenses 131 through 133 in the longitudinal direction (X-axis main scanning direction) of the scanning lenses 131-133. This line is referred to as an optical axis line, and a virtual plane that is orthogonal to the X-axis (main scanning direction) and passes through the lens center (optical axis line) is referred to as a sub scanning cross-section. The three protrusions 171 through 173 are arranged such that the center (equivalent with a virtual central axis 171a described later) of the protrusion 171 is in the same position in the X-axis direction as the sub scanning cross-section and the centers of the protrusions 172 and 173 have symmetry about the sub scanning cross-section in the X-axis direction.

Such a symmetrical arrangement prevents the scanning lenses 131 through 133, which are parallel to an X-Y axes plane, from inclining in the Z-axis direction.

Specifically, for example, when the protruding receiving portions 191a and 191b at the upper surface 151 of the holding plate 150 have symmetry about the sub scanning cross-section, heat discharged from the polygon motor 122 during rotation and transmitted to the bottom surface 101 of the device housing 100 is assumed to flow through the protrusion 171 to the holding plate 150, and then through the receiving portions 191a and 191b to the scanning lens 131. Here, if the position of the protrusion 171 in the X-axis direction in FIG. 3 is removed from the sub scanning cross-section to the left, the receiving portion 191a supporting the scanning lens 131 would be closer to the protrusion 171 than the receiving portion 191b.

A greater amount of heat is transmitted to portions of the scanning lens 131 closer to the protrusion 171 than to portions of the scanning lens 131 farther from the protrusion 171. Accordingly, one end (left end in FIG. 3) of the scanning lens 131 in the longitudinal direction of the scanning lens 131 supported by the receiving portion 191a would have a higher temperature than the other end (right end in FIG. 3) supported by the receiving portion 191b, and a temperature difference between the one end and the other end of the scanning lens 131 in the longitudinal direction would be more likely to occur.

When difference in an expansion amount between the one end and the other end of the scanning lens 131 becomes great due to such a temperature difference, factors such as a refractive index tend to differ between the one end and the other end. Due to this, when, for example, positions on the photoreceptor drum 31 at which laser light beams that pass through the one end of the scanning lens 131 are irradiated and positions on the photoreceptor drum 31 at which laser light beams that pass through the other end of the scanning lens 131 are irradiated are removed greatly in the sub scanning direction, a main scanning line connecting a position on the photoreceptor drum 31 at which scanning by laser light beams starts and a position on the photoreceptor drum 31 at which scanning by laser light beams ends is angled away from a direction parallel to the main scanning direction (hereinafter referred to as scanning line inclination).

When such scanning line inclination occurs, an image formed on the photoreceptor drum 31 may be distorted. When an image formed on the photoreceptor drum 31 is distorted to a great extent, image quality of the image formed on the photoreceptor drum 31 deteriorates.

Meanwhile, when the protruding receiving portions 191a and 191b have symmetry about the sub scanning cross-section as described above, a distance from the receiving portion 191a to the protrusion 171 and a distance from the receiving portion 191b to the protrusion 171 are substantially the same on a holding plate 150. Due to this, a heat amount transmitted from the protrusion 171 through the holding plate 150, then through the receiving portion 191a to the scanning lens 131 is substantially the same as a heat amount transmitted from the protrusion 171 through the holding plate 150, then through the receiving portion 191b to the scanning lens 131, and temperature difference is not likely to occur between one end and the other end of the scanning lens 131 in the longitudinal direction of the scanning lens 131. This suppresses occurrence of scanning line inclination described above.

The following describes temperatures of the scanning lenses 132 and 133, presupposing a situation in which a position of the protrusion 173 in the X-axis direction is removed greatly to the left in FIG. 3 to a position directly under a right end portion of the scanning lens 133 in the longitudinal direction of the scanning lens 133 while the receiving portion 192 corresponding to the scanning lens 132 and the receiving portion 193 corresponding to the scanning lens 133 are at positions passing through the sub scanning cross-section. Here, due to heat transmitted from the protrusion 173 to the holding plate 150, the right end portion of the scanning lens 133 in the longitudinal direction of the scanning lens 133 directly above the protrusion 173 and a right end portion of the scanning lens 132 in the longitudinal direction of the scanning lens 132 close to the right end portion of the scanning lens 133 in the longitudinal direction of the scanning lens 133 are likely to have greater temperatures than the left end portions of the scanning lenses 132 and 133. This indicates that, in a manner similar to the scanning lens 131, a temperature difference occurs between one end and the other end of the scanning lens 132 in the longitudinal direction of the scanning lens 132 and between one end and the other end of the scanning lens 133 in the longitudinal direction of the scanning lens 133. As a result, scanning line inclination is likely to occur.

Meanwhile, when the protrusions 172 and 173 have symmetry as described above, a distance from the protrusion 172 to one end of the scanning lens 132 in the longitudinal direction of the scanning lens 132 and a distance from the protrusion 173 to the other end of the scanning lens 132 in the longitudinal direction of the scanning lens 132 are substantially the same. Likewise, a distance from the protrusion 172 to one end of the scanning lens 133 in the longitudinal direction of the scanning lens 133 and a distance from the protrusion 173 to the other end of the scanning lens 133 in the longitudinal direction of the scanning lens 133 are substantially the same. Accordingly, temperature difference between the one end and the other end of the scanning lens 132 and temperature difference between the one end and the other end of the scanning lens 133 are not likely to occur. This suppresses the scanning lenses 132 and 133 from becoming biased and therefore suppresses occurrence of scanning line inclination described above.

Note that the optical lenses do not necessarily have symmetry as described above when scanning line inclination occurs only to a small extent that would not cause quality deterioration of formed images even without the above-described symmetrical positional relationships. Further, the number of the receiving portions for a scanning lens may not necessarily be as described above; a scanning lens may have one receiving portion or a plurality of receiving portions. When a scanning lens has two or more receiving portions, two of the receiving portions may have symmetry about the sub scanning cross-section.

As illustrated in FIG. 5, the device housing 100 has three through-holes (penetrating holes) 161, 162, and 163 penetrating the base 103. The through-hole 161 is at a position of the base 103 located between the rotational axis 123 of the polygon mirror 121 (equivalent with the rotational axis of the polygon motor 122) and the protrusion 171 and surrounding the protrusion 171, and has a shape of a semicircular arc in plan view of the base 103. Similarly, the through-hole 162 is at a position of the base 103 located between the rotational axis 123 of the polygon mirror 121 and the protrusion 172 and surrounding the protrusion 172, and has a shape of a semicircular arc; likewise, the through-hole 163 is at a position of the base 103 located between the rotational axis 123 of the polygon mirror 121 and the protrusion 173 and surrounding the protrusion 173, and has a shape of a semicircular arc.

The through-holes 161 through 163 cause heat discharged from the polygon motor 122 and transmitted through the base 103 toward the protrusions 171 through 173 to take roundabout paths before reaching the protrusions 171 through 173. Arrows G represented as broken lines in FIG. 5 schematically illustrate how transmitted heat passes around the through-hole 161.

Figure 7:
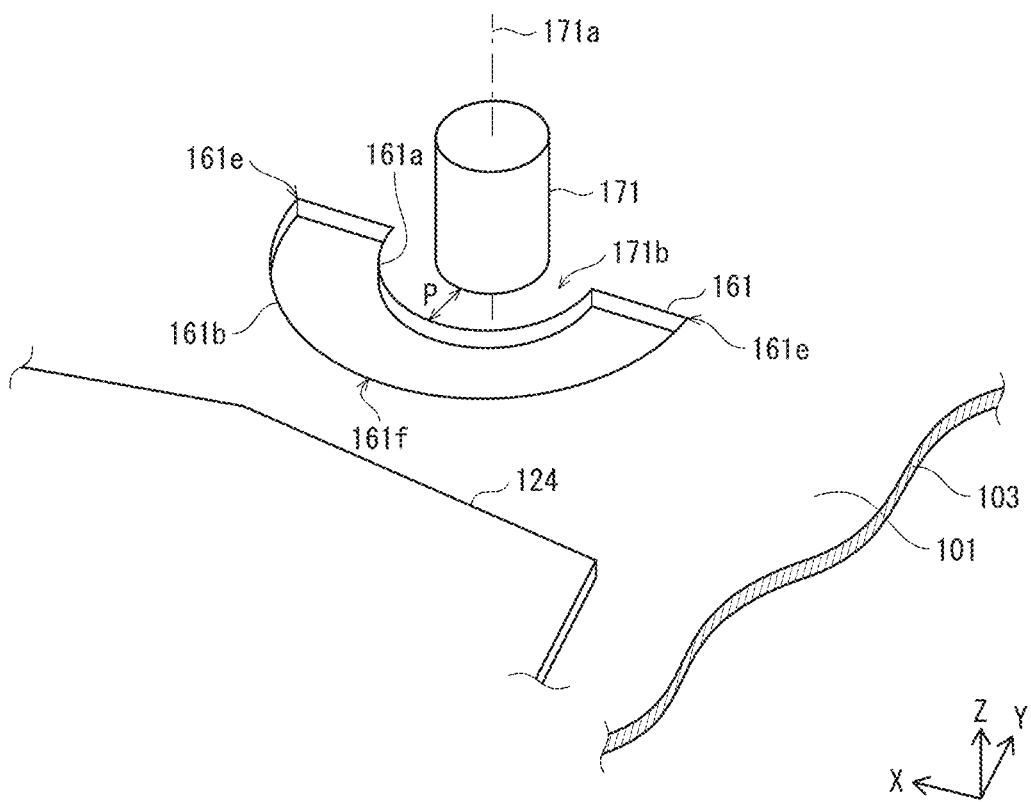
FIG. 7 is a schematic perspective view of a protrusion and a through-hole seen from a direction indicated by arrow D in FIG. 5.

FIG. 7 is a schematic perspective view illustrating the protrusion 171 and the through-hole 161 viewed from a direction indicated by arrow D in FIG. 5. As illustrated in FIG. 7, an inner circumferential arc portion (arc curve) 161a and an outer circumferential arc portion (arc curve) 161b that form a contour of the through-hole 161 have a center at the virtual central axis 171a of the columnar-shaped protrusion 171. Such a positional relationship is hereinafter referred to as a concentric relationship. Specifically, the through-hole 161 has a concentric relationship with the protrusion 171. Similarly, the through-hole 162 has a concentric relationship with the protrusion 172 and the through-hole 163 has a concentric relationship with the protrusion 173. Such concentric relationships aim at suppressing strength deterioration of the base 103 due to the existence of through-holes.

When, for example, the through-hole 161 has a concentric relationship with the protrusion 171, a gap P of a portion 171b between the protrusion 171 and the through-hole 161 at the base 103 is equalized in a circumferential direction of the protrusion 171. This allows strength of the portion 171b to be equalized in the circumferential direction. Due to this structure, even when the device housing 100 or the holding plate 150 receives a certain external force that exerts a stress causing the portion 171b between the protrusion 171 and the through-hole 161 at the base 103 to be deformed in, for example, the upper-lower direction, such a stress is likely to be dispersed uniformly. This prevents the portion 171b from being deformed due to the stress concentrating to a part of the portion 171b having an exceedingly small strength. The same applies to the set of the protrusion 172 and the through-hole 162 and the set of the protrusion 173 and the through-hole 163.

Referring back to FIG. 5, the through-hole 161 in plan view has symmetry about a virtual plane 181 (indicated by a dot and dash line in FIG. 5) passing through the rotational axis 123 of the polygon mirror 121 and the virtual central axis 171a of the protrusion 171. When the through-hole 161, which has an elongated shape, has symmetry about the virtual plane 181 as in the above, the center of the through-hole 161 in the longitudinal direction of the through-hole 161 is on the virtual plane 181. Similarly, the through-hole 162 in plan view has symmetry about a virtual plane 182 (dot and dash line) passing through the rotational axis 123 of the polygon mirror 121 and the virtual central axis 172a of the protrusion 172; likewise, the through-hole 163 in plan view has symmetry about a virtual plane 183 (dot and dash line) passing through the rotational axis 123 of the polygon mirror 121 and the virtual central axis 173a of the protrusion 173.

Due to such symmetrical shapes, heat of the polygon motor 122 passing around any one of the through-holes 161 through 163 while being transmitted through the base 103 toward a corresponding one of the protrusions 171 through 173 is divided into a right portion and a left portion relative to a corresponding one of the virtual planes 181 through 183 at substantially equal ratios, and the right portion and the left portion of the heat are transmitted through roundabout paths. In such a structure, the left portion and the right portion of the heat are likely to be dissipated before reaching the corresponding one of the protrusions 171 through 173 to a greater extent than in a structure in which heat is transmitted to the protrusions 171 through 173 where an exceedingly great portion of the heat is included in one of the left portion or the right portion.

Because of the through-holes 161 through 163, heat transmission paths through which heat discharged from the polygon motor 122 pass through the base 103 and reach the protrusions 171 through 173 are longer than in a structure having no through-hole. Heat dissipation while passing through the heat transmission paths is promoted in accordance with the lengths of the heat transmission paths, and small heat amounts are transmitted from the bottom surface 101 of the device housing 100 to the protrusions 171 through 173.

The protrusions 171 through 173 intervene between the bottom surface 101 of the device housing 100 and the lower surface 152 of the holding plate 150 and support the holding plate 150 with the holding plate 150 being spaced away from the base 103 in an upper direction. Due to this, heat of the base 103 is directly transmitted to the holding plate 150 only through the protrusions 171 through 173 and reaches the scanning lenses 131 through 133 through the holding plate 150.

When applying the present embodiment to a typical light beam scanning device mounted to an image forming device, it is desirable that the diameter of a protrusion be in a range from 5 mm to 10 mm, the height of a protrusion be in a range from 0.5 mm to 5 mm, the width of an elongated through-hole be in a range from 2 mm to 10 mm, and a distance P between an inner circumferential arc curve of the through-hole and a protrusion be in a range from 2 mm to 5 mm.

As described above, the present embodiment: (a) has a holding plate 150 holding the scanning lenses 131 through 133 that is independent from the device housing 100; (b) has pillar-shaped protrusions 171 through 173 between the bottom surface 101 of the device housing 100 and the lower surface 152 of the holding plate 150 that space the holding plate 150 away from the base 103 so that the scanning lenses 131 through 133 are not in direct contact with the base 103; and (c) has through-holes 161 through 163 at positions between the polygon motor 122 and the protrusions 171 through 173 at the base 103 in proximity of the protrusions 171 through 173, respectively.

In this structure, heat transmission paths from the polygon motor 122 to the scanning lenses 131 through 133 are longer than in a structure in which a scanning lens is mounted directly onto the base 103. Accordingly, even when the polygon motor 122 is rotated at a high speed, dissipation of heat discharged from the polygon motor 122 is promoted while the heat passes through the base 103 and is transmitted through the protrusions 171 through 173 and the holding plate 150 to the scanning lenses 131 through 133. Further, because the holding plate 150 also functions as a heat discharging member, heat amounts reaching the scanning lenses 131 through 133 are small. This structure thus suppresses thermal deformation of the scanning lenses 131 through 133.

In the above, description is provided of an example in which the through-holes have a shape of a semicircular arc in plan view of the base 103, but the through-holes may have, for example, a shape of a square bracket (i.e. a shape consisting of a long straight section and two short straight sections that sandwich the long straight section and are at right angles to the long straight section).

Figure 8A:
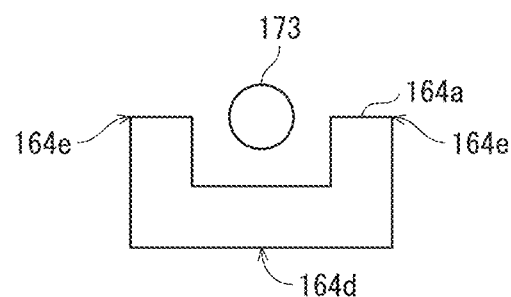
FIG. 8A is a schematic plan view illustrating an exemplary structure in which the through-hole has a square-bracket shape.
Figure 8B:
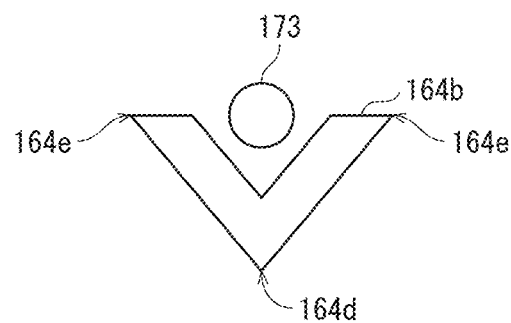
FIG. 8B is a schematic plan view illustrating an exemplary structure in which the through-hole has a V-shape.

FIG. 8A is a schematic plan view illustrating an exemplary structure in which the through-holes have a square-bracket shape, and FIG. 8B is a schematic plan view illustrating an exemplary structure in which the through-holes have a V-shape.

FIG. 8A illustrates only a through-hole 164a corresponding to a protrusion 173, and FIG. 8B illustrates only a through-hole 164b corresponding to a protrusion 173. Other through-holes corresponding to other protrusions 171 and 172 may have a shape similar to the through-hole 164a or the through-hole 164b.

FIG. 9 illustrates a temperature distribution at the base 103 when only a through-hole 167 corresponding to the protrusion 171 is formed in (i) an arc shape, (ii) a square-bracket shape, and (iii) a circular shape (simple hole). FIG. 9 also illustrates an example including no through-hole.

FIG. 9 illustrates temperature distribution obtained through simulation by using a certain light scanning unit as a model. The thicker the shade indicating temperature distribution is, the higher the temperature at the position of the shade is. The polygon motor, which is the heat source, is arranged at the center of a portion with the thickest shade.

As illustrated in FIG. 9, the protrusion 171 has a lower temperature when the through-hole 167 has an arc shape and a square-bracket shape than when the through-hole 167 is a simple hole and when there is no through-hole. This is construed as being due to heat passing around the through-hole 167 when transmitting to the protrusion 171, and a heat amount reaching the protrusion 171 being reduced greatly because of the heat dissipated while passing around the through-hole 167.

When the through-hole 167 is a simple hole, the protrusion 171 does not have a temperature lower than when the through-hole 167 has an arc shape and a square-bracket shape, but has a slightly lower temperature than when there is no through-hole.

Meanwhile, the protrusion 171 has a lower temperature when the through-hole 167 has a square-bracket shape than when the through-hole 167 has an arc shape. However, when the through-hole 167 has a square-bracket shape, a temperature difference between portions of the base 103 close to the protrusion 171 relative to the through-hole 167 and portions of the base 103 close to the polygon motor 122 relative to the through-hole 167 is greater than when the through-hole 167 has an arc shape. The greater such a temperature difference is, the greater a heat expansion difference between portions of the base 103 around the protrusion 171 and portions of the base 103 around the polygon motor is. Consequently, portions of the base 103 around the through-hole 167 having a great heat expansion difference are likely to deform. Further, when the through-hole 167 has a square-bracket shape, strength of corner portions having a right-angle shape is likely to be small.

As described above, a temperature reduction amount of the protrusion 171 may differ depending on the shape of the through-hole 167. Further, deformation or strength deterioration of the base 103 is more likely to occur when the through-hole 167 has a certain shape than when the through-hole 167 has other shapes. Accordingly, the shape of the through-holes that is suitable for the structure of a light scanning unit is selected from among shapes such as an arc shape, a square-bracket shape, and a V-shape for each light scanning unit through experiments, simulations, or the like.

In the above, description is provided of an exemplary structure in which the through-holes 161 through 163 have semicircular arc shapes having central angles of 180° about the virtual central axes 171a through 173a of the protrusions 171 through 173. However, the present embodiment is not limited to this, and the through-holes 161 through 163 may have semicircular arc shapes having central angles of, for example, 90° or 120°. When the central angles exceed 180°, more than half of the circular portion about the portion of the base 103 at which a protrusion is formed is a through-hole. This causes strength of the portion at which the protrusion is formed to deteriorate. Accordingly, it is desirable that the central angles be 180° or less.

Further, description is provided of an exemplary structure in which the arc-shaped through-holes 161 through 163 respectively have a concentric relationship with the columnar protrusions 171 through 173, but the present embodiment is not limited to this.

Further, when a protrusion and its corresponding through-hole (i.e. the protrusion 171 and the through-hole 161 corresponding to the protrusion 171, the protrusion 172 and the through-hole 162 corresponding to the protrusion 172, or the protrusion 173 and the through-hole 163 corresponding to the protrusion 173) are too close to each other, strength of portions of the base 103 around such a protrusion may be small. Meanwhile, when a protrusion and its corresponding through-hole are too far from each other, the effect of causing heat discharged from the polygon mirror 121 to pass around the protrusions 171 through 173, i.e. causing the heat transmission paths of the heat discharged from the polygon mirror 121 to be long is small and the heat is likely to reach the protrusions 171 through 173. In view of this, lengths, widths, and the like of the through-holes in the circumferential direction are predetermined in accordance with the structure of the device.

Specifically, given that the protrusions 172 and 173 are farther from the polygon motor 122 than the protrusion 171, which is the closest to the polygon motor 122, and thus the protrusions 172 and 173 receive a smaller amount of heat from the polygon motor 122 than the protrusion 171, the through-hole 162 corresponding to the protrusion 172 and the through-hole 163 corresponding to the protrusion 173 may, for example, have at least one of the following: (i) a smaller length in the circumferential direction; (ii) a smaller width; and (iii) a smaller central angle described above, than the through-hole 161 corresponding to the protrusion 171. Strength deterioration of the base 103 due to existence of a through-hole is suppressed to a greater extent when the through-hole is smaller.

In the above, the holding plate 150 is made of a metal or a resin, but the present embodiment is not limited to this. It is desirable to satisfy, for example, one or both of the following: (i) the holding plate 150 has a smaller thermal conductivity than the base 103; and (ii) the holding plate 150 has the same or substantially the same linear expansion coefficient as the base 103. For example, a metal material satisfying the above condition or a resin including a filler and satisfying the above condition can be used.

The smaller the thermal conductivity of the holding plate 150, the greater the reduction in heat transmitted from the protrusions 171 through 173 through the holding plate 150 to the scanning lenses 131 through 133. Further, the smaller the difference in the linear expansion coefficient of the base 103 and the linear expansion coefficient of the holding plate 150, the smaller the difference in an expansion amount of the base 103 and an expansion amount of the holding plate 150 when the base 103 and the holding plate 150 undergo thermal expansion along the X-Y axis plane. This suppresses thermal deformation of the base 103 and the holding plate 150 due to one of the base 103 and the holding plate 150 having a greater expansion amount than the other of the base 103 and the holding plate 150.

Embodiment 2

In Embodiment 1 above, description is provided of an exemplary structure in which three through-holes 161 through 163 are at the base 103 of the device housing 100. Embodiment 2 differs from Embodiment 1 in that Embodiment 2 includes only one through-hole. Hereinafter, description of the same features as those in Embodiment 1 is not provided and the same components as those in Embodiment 1 have the same reference numbers in order to avoid duplicate description.

Figure 10:
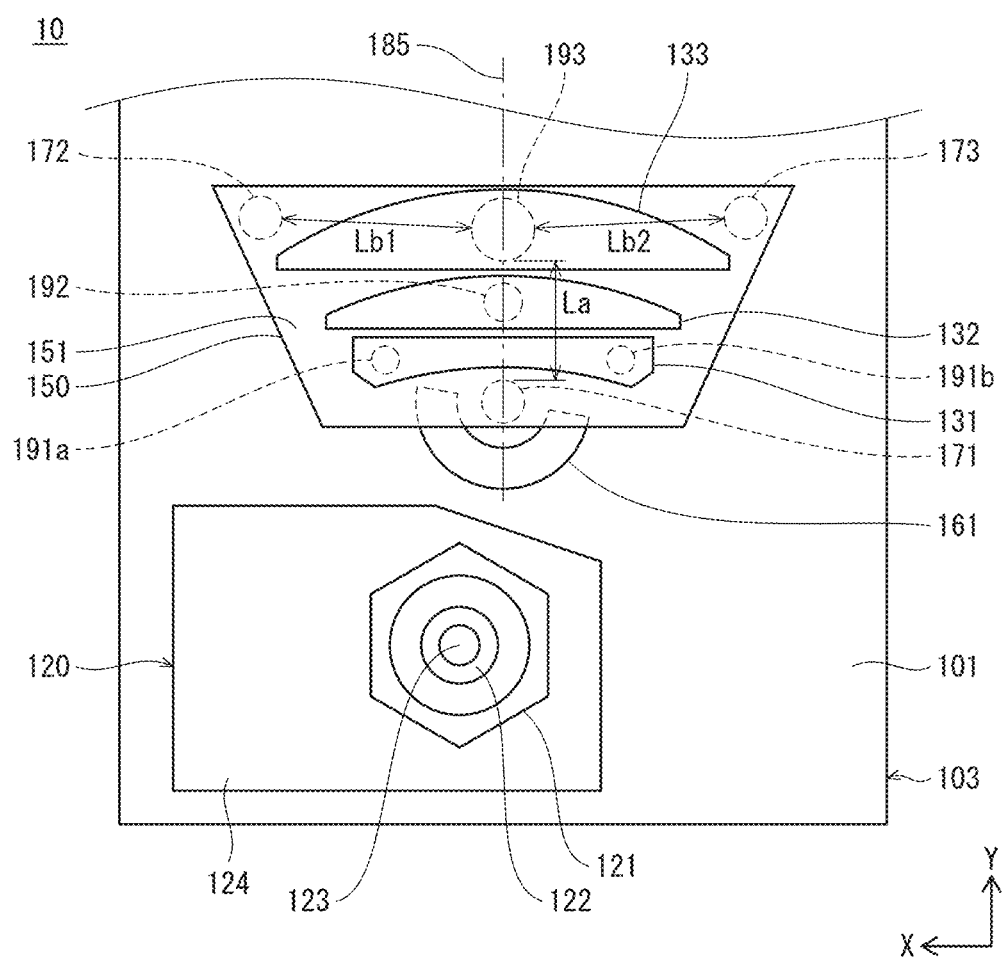
FIG. 10 is a plan view illustrating an exemplary structure of a light scanning unit pertaining to Embodiment 2.

FIG. 10 is a plan view illustrating an exemplary structure of a light scanning unit pertaining to Embodiment 2. The exemplary structure in FIG. 10 has a single through-hole 161 corresponding to the protrusion 171, and through-holes corresponding to the protrusions 172 and 173 are nonexistent.

This structure can be understood as a structure in which, when dividing the three protrusions 171 through 173 into a first group including a protrusion (namely, the protrusion 171) that is close to the polygon motor 122 and a second group including protrusions (namely, the protrusions 172 and 173) that are farther from the polygon motor 122 than the protrusion 171, only the through-hole 161 corresponding to the protrusion 171, which belongs to the first group, is included.

The through-hole 161 in the present embodiment has the same shape as the through-hole 161 pertaining to Embodiment 1 illustrated in FIG. 3. The following describes the reason why only the through-hole 161, which corresponds to the protrusion 171, is included.

In some device structures, the protrusion 171, which is the closest to the polygon motor 122, tends to have a high temperature due to heat transmission from the polygon motor 122, while the protrusions 172 and 173, which are farther from the polygon motor 122 than the protrusion 171, may not reach a temperature at which thermal deformation of the scanning lenses occurs. In such cases, a reduction in strength of the base 103 is minimized by not forming the through-holes corresponding to the protrusions 172 and 173.

Further, in some device structures, the protrusion 171 may have a temperature lower than the protrusions 172 and 173 due to existence of the through-hole 161, which corresponds to the protrusion 171. In such cases, it is desirable that, for example, the scanning lens 133 is arranged at a position satisfying La1<Lb1 and La1<Lb2, where La indicates a distance from a portion of the holding plate 150 at which the holding plate 150 is connected to the protrusion 171 (fastening portion) to a portion of the holding plate 150 at which the receiving portion 193, which corresponds to the scanning lens 133, is arranged (at which the scanning lens 133 is connected to the receiving portion 193); Lb1 indicates a distance from a portion of the holding plate 150 at which the holding plate 150 is connected to the protrusion 172 to a portion of the holding plate 150 at which the receiving portion 193 is arranged; and Lb2 indicates a distance from a portion of the holding plate 150 at which the holding plate 150 is connected to the protrusion 173 to a portion of the holding plate 150 at which the receiving portion 193 is arranged. The following describes the reason why the scanning lens 133 is arranged as such.

Heat transmitted from the holding plate 150 to the scanning lens 133 mainly passes through the receiving portion 193, which is in direct contact with the scanning lens 133. Accordingly, transmission paths of heat transmitted from the protrusions 172 and 173, which have temperatures higher than the protrusion 171, through the holding plate 150 to the receiving portion 193 is longer when the distance Lb1 from the protrusion 172 to the receiving portion 193 and the distance Lb2 from the protrusion 173 to the receiving portion 193 each are longer than the distance La from the protrusion 171 to the receiving portion 193. Heat transmitted to the scanning lens 133 thus is smaller due to heat dissipation when passing through the heat transmission paths.

The same applies to other scanning lenses 131 and 132. It is desirable that, on the holding plate 150, for example, a distance from the receiving portion 192, which corresponds to the scanning lens 132, to the protrusion 172 and a distance from the receiving portion 192 to the protrusion 173 each be longer than a distance from the receiving portion 192 to the protrusion 171.

Further, it is desirable that, on the holding plate 150, a distance from the receiving portion 191a, which corresponds to the scanning lens 131, to the protrusion 172 be longer than a distance from the receiving portion 191a to the protrusion 171, and a distance from the receiving portion 191b to the protrusion 173 be longer than a distance from the receiving portion 191b to the protrusion 171.

Meanwhile, when the protrusions 172 and 173 have a temperature lower than the temperature of the protrusion 171 and a temperature at which scanning lens deformation occurs, the present embodiment may have a structure satisfying, for example, La>Lb1 and La>Lb2.

Relationships between the distances La, Lb1, and the like may be predetermined depending on a device structure in accordance with heat increase amounts of the protrusions 171 through 173 due to heat from the polygon motor 122, so that heat amounts transmitted from the polygon motor 122 through the base 103, the protrusions 171 through 173, and the holding plate 150 to the scanning lenses 131 through 133 are suppressed to a greater extent.

Embodiment 3

In Embodiment 1 above, description is provided of an exemplary structure in which the holding plate 150 is supported at three positions by three protrusions at the base 103 of the device housing 100 and three through-holes are included. Embodiment 3 differs from Embodiment 1 in that the holding plate 150 is supported at four positions by four protrusions and that two through-holes are included.

Figure 11:
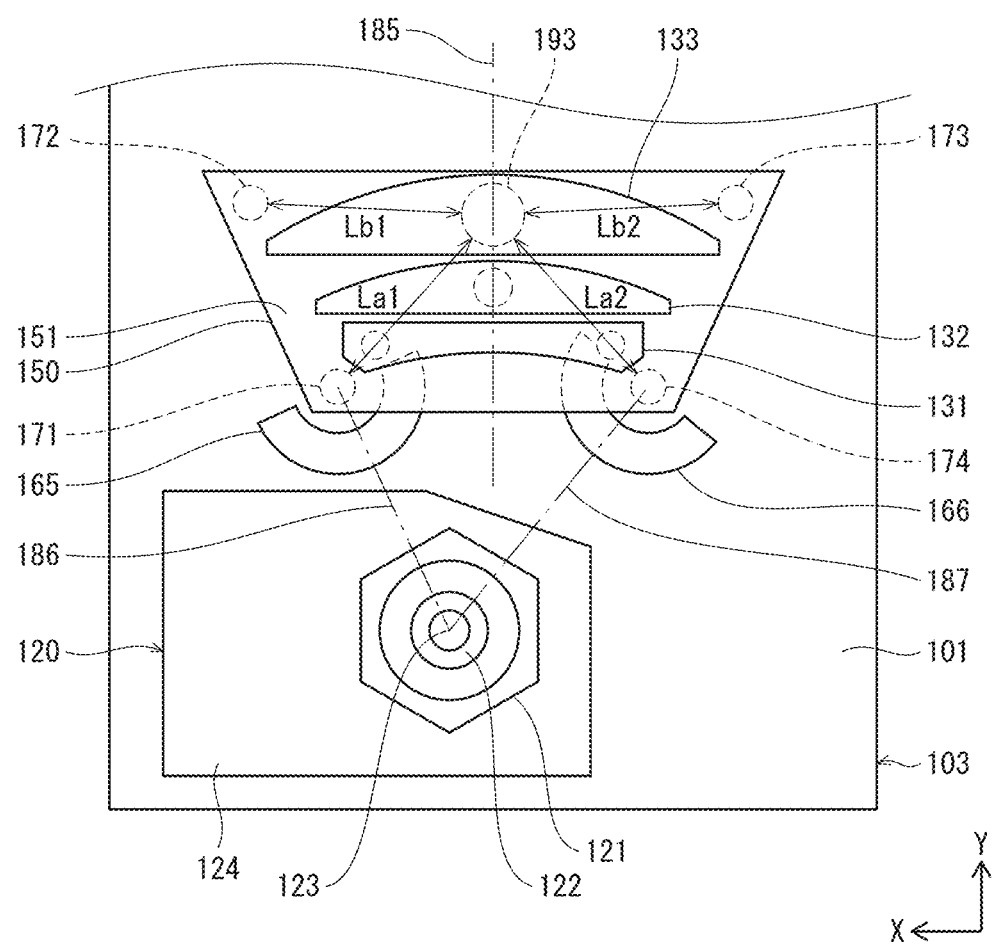
FIG. 11 is a plan view illustrating an exemplary structure of a light scanning unit pertaining to Embodiment 3.

FIG. 11 is a plan view illustrating an exemplary structure of a light scanning unit pertaining to Embodiment 3.

As illustrated in FIG. 11, a trapezoidal holding plate 150 is, at positions inward of four corners of the holding plate 150, fixed to and supported by protrusions 171 through 174 arranged at the base 103. Further, the base 103 has through-holes 165 and 166 respectively corresponding to the two protrusions 171 and 174 that are closer to the polygon motor 122 among the protrusions 171 through 174, and has no through-holes corresponding to the two protrusions 172 and 173 that are farther from the polygon motor 122 than the protrusions 171 and 174.

In a manner similar to Embodiment 1, the two protrusions 172 and 173 have symmetry about the sub scanning cross-section in the X-axis direction. The same applies to the two protrusions 171 and 174.

The through-holes 165 and 166 each have a semicircular arc shape in plan view of the base 103, in a manner similar to the through-holes 161 through 163 illustrated in FIG. 3 of Embodiment 1. Further, the through-hole 165 has symmetry about a virtual plane 186 (indicated by a dot and dash line in FIG. 11) passing through the rotational axis 123 of the polygon mirror 121 and the virtual central axis of the protrusion 171. Similarly, the through-hole 166 has symmetry about a virtual plane 187 (indicated by a dot and dash line in FIG. 11) passing through the rotational axis 123 of the polygon mirror 121 and the virtual central axis of the protrusion 174.

A structure described above in which the holding plate 150 is fixed to the base 103 at four positions and which includes only through-holes 165 and 166 respectively corresponding to the two protrusions 171 and 174, which are protrusions close to the polygon motor 122, minimizes strength deterioration of the base 103 while suppressing thermal deformation of the scanning lenses caused by heat of the polygon motor 122.

In a manner similar to Embodiment 2 above, in some device structures, the protrusions 171 and 174 may have a temperature lower than the protrusions 172 and 173 due to existence of the through-hole 165 and 166, which respectively correspond to the protrusion 171 and the protrusion 174.

In such cases, the scanning lens 133 may desirably be arranged so that La1<Lb1, La1<Lb2, La2<Lb1, and La2<Lb2 are satisfied. Here, La1 indicates a distance from a portion of the holding plate 150 at which the holding plate 150 is connected to the protrusion 171 to a portion of the holding plate 150 at which the receiving portion 193, which corresponds to the scanning lens 133, is arranged (at which the scanning lens 133 is connected to the receiving portion 193); La2 indicates a distance from a portion of the holding plate 150 at which the holding plate 150 is connected to the protrusion 174 to a portion of the holding plate 150 at which the receiving portion 193 is arranged; Lb1 indicates a distance from a portion of the holding plate 150 at which the holding plate 150 is connected to the protrusion 172 to a portion of the holding plate 150 at which the receiving portion 193 is arranged; and Lb2 indicates a distance from a portion of the holding plate 150 at which the holding plate 150 is connected to the protrusion 173 to a portion of the holding plate 150 at which the receiving portion 193 is arranged.

In this structure, in a manner similar to Embodiment 2, transmission paths of heat transmitted from the protrusions 172 and 173, which have temperatures higher than the protrusions 171 and 174, through the holding plate 150 to the receiving portion 193 is relatively long, and heat transmitted to the scanning lens 133 is relatively small due to heat dissipation when passing through the heat transmission paths. The same applies to other scanning lenses 131 and 132.

Meanwhile, description is provided in the above of an exemplary structure in which, when dividing the protrusions 171 through 174 into a first group including protrusions (namely, the protrusions 171 and 174) that are close to the polygon motor 122 and a second group including protrusions (namely, the protrusions 172 and 173) that are farther from the polygon motor 122 than the protrusions 171 and 174, only the through-holes 165 and 166 respectively corresponding to the protrusion 171 and 174, which belong to the first group, are included. However, the present embodiment is not limited to this. For example, in a structure in which a small amount of heat is transmitted to the protrusion 174, a structure in which only the through-hole 165, which corresponds to the protrusion 171, is included is possible. That is, Embodiments 1 through 3 can be modified into a structure in which at least one of the plurality of protrusions has a through-hole corresponding to the protrusion.

Embodiment 4

Embodiment 4 describes a structure including a heat sink for heat dissipation at a lower surface of the base 103 of the device housing 100.

Figure 12:
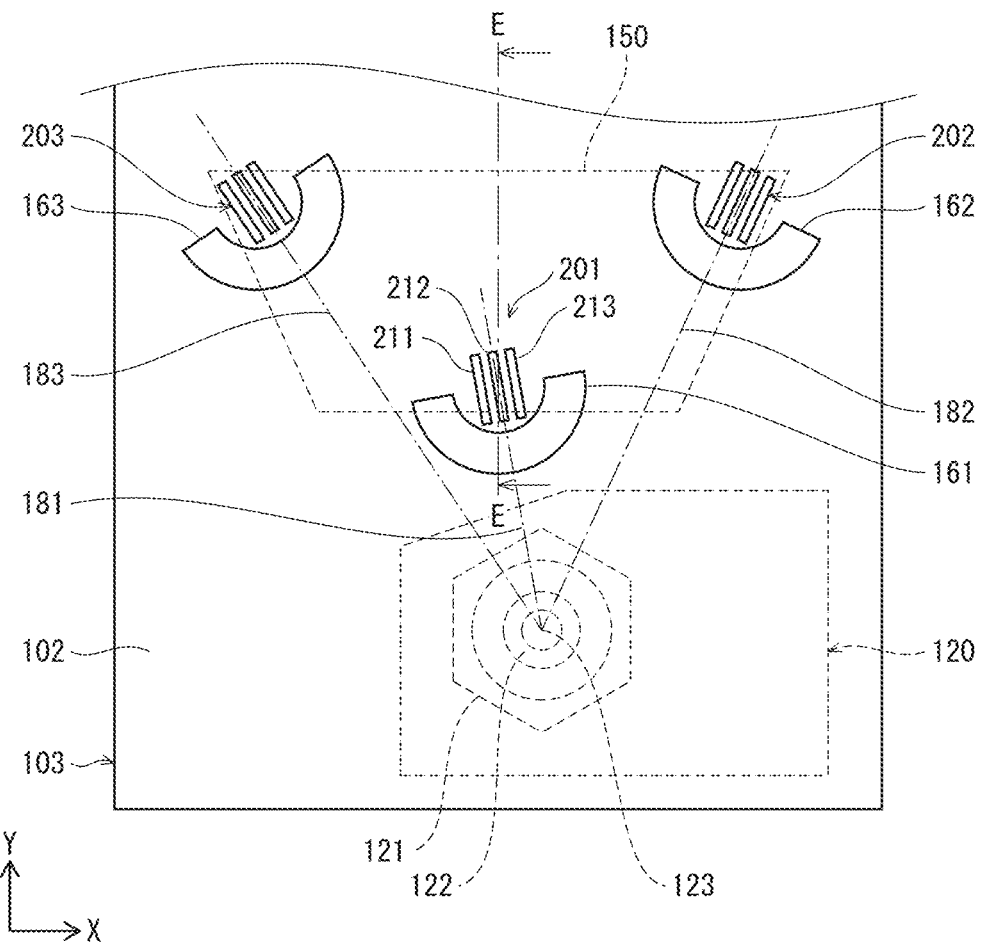
FIG. 12 is a bottom view illustrating an exemplary structure of a light scanning unit pertaining to Embodiment 4.
Figure 13:
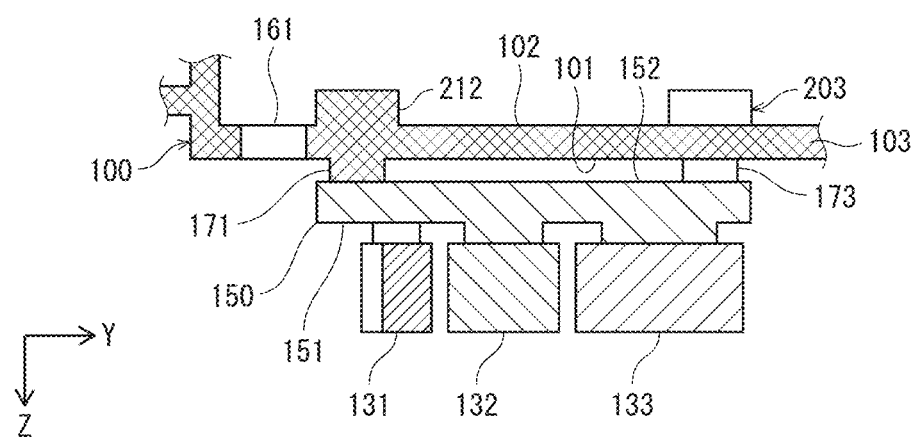
FIG. 13 is a cross-sectional view taken along line E-E in FIG. 12.

FIG. 12 is a bottom view illustrating an exemplary structure of a light scanning unit pertaining to Embodiment 4, and FIG. 13 is a cross-sectional view taken along line E-E in FIG. 12. FIG. 12 illustrates a structure in which heat sinks 201 through 203 are added to the structure illustrated in FIG. 3 pertaining to Embodiment 1 when viewed from below the base 103.

In a manner similar to the protrusions 171 through 173, the heat sinks 201 through 203 are integrally formed at the base 103 when forming the device housing 100, which is made of die-cast aluminum.

As illustrated in FIG. 12 and FIG. 13, the heat sink 201 includes three heat dissipation fins 211, 212, and 213.

Figure 14:
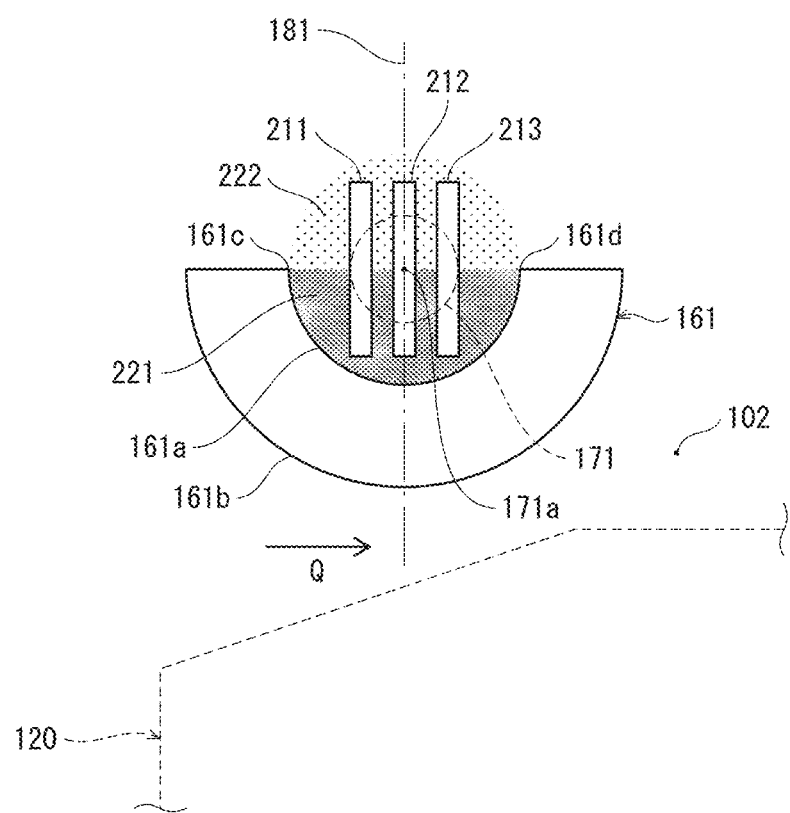
FIG. 14 is an enlarged view illustrating a positional relationship between heat dissipation fins and a through-hole.

The heat dissipation fins 211 through 213 are plate-like members having shapes of rectangles of the same size, and are arranged in an orientation parallel with each other and the virtual plane 181 (equivalent with the virtual plane 181 illustrated in FIG. 5), i.e. an orientation orthogonal to a lower surface 102. The heat dissipation fin 212 passes through the virtual plane 181. As illustrated in an enlarged view in FIG. 14, the heat dissipation fins 211 and 213 oppose each other across the heat dissipation fin 212 at equal intervals from the heat dissipation fin 212 in a direction indicated by arrow Q (a direction orthogonal to the virtual plane 181).

The positional relationship between the heat dissipation fins 211 through 213 and the through-hole 161 is as in the following. A region on the base 103 surrounded by an arc curve 161a and a line segment connecting one end 161c of the arc curve 161a and the other end 161d of the arc curve 161a illustrated in FIG. 14 (through-hole surrounding region) is referred to as a region 221. Here, the arc curve 161a is an arc curve that is closer, among two arc curves 161a and 161b forming a contour of the through-hole 161, to a virtual central axis 171a that is the center of the arc. Further, a region on the base 103 that is outwards from the region 221 and adjacent to the region 221 is referred to as a region 222 (outward region). Meanwhile, the arc curve 161b is an outer contour portion that is an arc curve closer to the polygon motor 122 among the contour of the through-hole 161, and the arc curve 161a is an inner contour portion that is an arc curve farther from the polygon motor 122.

The heat dissipation fins 211, 212, and 213 each span over the two regions 221 and 222. Because of existence of the semicircular arc shaped through-hole 161, the region 221 on the base 103 has a shape of a section (a protruding piece) with a free end at a tip portion. Due to having such a shape, the region 221 on the base 103 tends to have a small strength. The above-described positional relationship aims at suppressing such strength deterioration.

Specifically, since the heat dissipation fins 211, 212, and 213 each span over the region 221 which have the free end and the region 222 which is immovably fixed, the heat dissipation fins 211 through 213 also function as reinforcing members reinforcing the region 221 having the free end. Due to this structure, the region 221 on the base 103 has a greater strength than in a structure having no heat dissipation fin, while achieving heat dissipation effect. Meanwhile, the present embodiment is not limited to a structure in which all of the heat dissipation fins 211 through 213 span over the region 221 and the region 222 as described above. The present embodiment may have a structure in which at least one heat dissipation fin spans over the region 221 and the region 222.

Further, because the heat dissipation fins 211 and 213 have symmetry about the heat dissipation fin 212 arranged at the center of the three heat dissipation fins 211 through 213, strength distribution of the region 221 is not likely to be uneven in a direction in which the three heat dissipation fins 211 through 213 are arranged (a direction indicated by arrow Q). Due to this, strength of the region 221 on the base 103 tends to be more stable than in a structure in which strength distribution is uneven.

Because the region 221 on the base 103 is also a region corresponding to the region of the bottom surface 101 of the base 103 at which the protrusion 171 (dotted line) supporting the holding plate 150 is arranged, it is desirable that the region 221 have a relatively great strength. For example, even when vibration of members in the image forming device, such as motors for rotating and driving the photoreceptor drums 31 and rollers for conveying recording sheets, is transmitted to the device housing 100 during job execution, such vibration is less likely to be transmitted from the base 103 through the holding plate 150 to the scanning lenses as long as the base 103 has a great strength. This structure suppresses scanning line inclination caused by a large portion of such vibration being transmitted to the scanning lenses.

In the above, description is provided of an exemplary structure of the heat sink 201. Other heat sinks 202 and 203 have a structure similar to the structure of the heat sink 201, and thus explanation thereof is not provided.

As described above, the heat sinks 201 through 203 at the lower surface 102 of the base 103 reinforce strength of the base 103 while promoting dissipation of heat transmitted from the polygon motor 122 through the base 103 to the protrusions 171 through 173 by dissipating the heat from the lower surface 102 into the air.

In the above, description is provided of a structure in which the heat sinks 201 through 203 each have three heat dissipation fins. However, the present embodiment is not limited to this. For example, the present embodiment may include one heat dissipation fin, two heat dissipation fins, or four or more heat dissipation fins.

For example, when an even number of heat dissipation fins are included, the heat dissipation fins are divided into two groups sandwiching the virtual plane 181 and each including the same number of heat dissipation fins. When the heat dissipation fins in a first group arranged at one side of the virtual plane 181 and the heat dissipation fins in a second group arranged at the other side of the virtual plane 181 are numbered from the heat dissipation fins closest to the virtual plane 181, each pair of one of the heat dissipation fins in the first group and one of the heat dissipation fins in the second group that are assigned with the same number is arranged such that the one of the heat dissipation fins in the first group and the one of the heat dissipation fins in the second group are spaced away from the virtual plane 181 at the same distance.

Further, when heat dissipation fins of an odd number of three or more are included, one heat dissipation fin may be arranged on the virtual plane 181, and other two or more heat dissipation fins may be arranged in a manner similar to when an even number of heat dissipation fins are included.

Further, the heat dissipation fins do not necessarily have rectangular shapes, and may have other shapes such as a square shape and an arc shape. In the above, description is provided of an arrangement in which the plurality of heat dissipation fins are parallel with each other, but the heat dissipation fins are not necessarily parallel with each other.

In the above, description is provided of an exemplary structure in which the heat sinks 201 through 203 are integrally molded with the base 103. However, it suffices for the present embodiment as long as the heat sinks are formed at the lower surface 102 of the base 103, and the heat sinks 201 through 203 may be, for example, adhered to the base 103 with adhesive or the like.

Further, each heat sink may include heat dissipation fins differing in number, shapes, sizes, materials, or the like. Specifically, for example, when one or two heat dissipation fins are enough for reinforcement of the base 103, the heat sink 201 corresponding to the protrusion 171, which is the closest to the polygon motor 122 among the protrusions 171 through 173 at the base 103, may include three heat dissipation fins 211 through 213, and the heat sinks 202 and 203 respectively corresponding to the protrusions 172 and 173 may each include only one or two heat dissipation fins.

Because the protrusion 171 is closer to the polygon motor 122 than other protrusions 172 and 173, the temperature of the protrusion 171 is likely to increase due to heat of the polygon motor 122. Accordingly, heat dissipation can be promoted and temperature increase can be suppressed by including three heat dissipation fins 211 through 213.

Meanwhile, because the protrusions 172 and 173 are farther from the polygon motor 122 than the protrusion 171, the temperatures of the protrusions 172 and 173 are less likely to be increased due to heat of the polygon motor 122 compared to the protrusion 171. Accordingly, there may be cases in which temperature increase of the protrusions 172 and 173 is suppressed without as many as three heat dissipation fins. In such cases, only one or two heat dissipation fins are sufficient for reinforcing strength of the base 103 and suppressing heat increase of the protrusions 172 and 173. Including a minimum necessary number of heat dissipation fins reduces materials used for forming the heat dissipation fins. As described above, the heat sinks 202 and 203 respectively corresponding to the protrusions 172 and 173 may each include a smaller number of heat dissipation fins than the heat sink 201 corresponding to the protrusion 171.

Further, when each of the heat sinks includes the same number of heat dissipation fins, the heat sinks 202 and 203 may each have heat dissipation fins of a smaller size than the heat sink 201.

In the above, description is provided of an exemplary structure including the heat sinks 201 through 203 respectively corresponding to the protrusions 171 through 173 on the base 103, but the present embodiment is not limited to this.

In a device structure such that, for example, strength deterioration due to existence of through-holes at the base 103 is so small that deterioration of images to be formed such as scanning line inclination described above would not occur and the temperatures of the protrusions 172 and 173, which are farther from the polygon motor 122 than the protrusion 171, do not increase up to a temperature at which thermal deformation of the scanning lenses occurs even without heat sinks, the present embodiment may have a structure including only the heat sink 201 corresponding to the protrusion 171 and not including other heat sinks 202 and 203. In such cases, only the protrusion 171 among the protrusions 171 through 173 is a specific fixed member having both the corresponding through-hole 161 and the corresponding heat sink 201.

Modifications

Although description has been provided with reference to embodiments of the light beam scanning devices pertaining to the present invention, the present invention should not be construed as being limited to the above embodiments, and the following modifications are possible.

(1) In the above embodiments, description is provided of an example in which the through-holes (penetrating holes) have an arc shape, a square bracket shape, or a V-shape in plan view of the base 103, but the present invention should not be construed as being limited to this. Instead of these shapes, the through-holes may have, for example, a C-shape or a U-shape. Also, the through-holes may have an elongated shape so that heat of the polygon motor 122 takes roundabout paths while being transmitted through the base 103 to the protrusion 171 through 173 by passing around the elongated through-holes. For example, the through-holes may have a shape of an elongated rectangle. Instead of an elongated shape, the through-holes may have a shape of, for example, a square, a circle, or an oval.

Further, an example is given of a structure in which the arc-shaped through-hole 161 is closer to the polygon motor 122 at a circumferential (longitudinal) central portion 161f (FIG. 7) at the center of the through-hole 161 in the circumferential direction (longitudinal direction) of the through-hole 161 than end portions 161e (FIG. 7) at the ends of the through-hole 161 in the longitudinal direction of the through-hole 161. However, the present invention should not be construed as being limited to this. For example, the present invention may include a structure including an inverse arc-shaped through-hole that is closer to the polygon motor 122 at end portions 161e than at a longitudinal central portion 161f.

Further, an example is given of a structure in which, as illustrated in FIG. 8A, the through-hole 164a having an elongated square bracket shape that is closer to the polygon motor 122 at a longitudinal central portion 164d than at end portions 164e and an exemplary structure in which, as illustrated in FIG. 8B, the through-hole 164b having a long and narrow V-shape that is closer to the polygon motor 122 at a longitudinal central portion 164d than at end portions 164e. However, the present invention should not be construed as being limited to this. The through-hole 164a and the through-hole 164b may each have an inverse shape as described above.

(2) In the above embodiments, description is provided of an exemplary structure including the through-hole 161 at a region around the protrusion 171 at the base 103 of the device housing 100. However, the present invention should not be construed as being limited to a through-hole (penetrating hole). Any structure in which heat from the polygon motor 122 takes roundabout paths while being transmitted through the base 103 of the device housing 100 to the protrusions 171 through 173 is sufficient.

For example, when the base 103 of the device housing 100 has a great thickness, a (bottomed) groove may be included instead of a penetrating hole. This is because a groove defines a space having a function of causing heat to pass around the space, in a manner similar to a penetrating hole. The groove may have a shape similar to the shape of the through-hole 161 or the like described above in plan view of the bottom surface 101 of the device housing 100.

Further, description is provided of an example in which the device housing 100 is made of die-cast aluminum, but a material of the base 103 should not be construed as being limited to aluminum. The present invention is applicable to a structure including a base 103 made of a metal such as iron, copper, or a brass, which is suitable for accurate positioning of members such as the scanning lenses. Further, the base 103 may not necessarily be made of a metal, and can be made of a material possessing thermal conductivity conducting heat causing thermal deformation of the scanning lenses to an extent such that image quality is affected. For example, the present invention is applicable to a structure which employs a base 103 made of a resin that is suitable for accurate positioning of the scanning lenses and has relatively high thermal conductivity. Specifically, a resin material to which filler is added may be used. As the filler, a material such as metal powder (powder of aluminum oxide, beryllium oxide, or the like) or an inorganic material (boron nitride or the like) may be used.

(3) In the above embodiments, the protrusions 171 through 173 have a columnar shape, but the shape of the protrusions 171 through 173 should not be construed as being limited to this. For example, the protrusions 171 through 173 may have a prism shape such as a triangular prism or a quadrangular prism.

Further, in the above embodiments, the holding plate 150 has a trapezoidal shape, but the shape of the holding plate 150 should not be construed as being limited to this. For example, the holding plate 150 may have a rectangular shape, an oval shape, or the like.

(4) In the above embodiments, description is provided of an exemplary structure in which three scanning lenses 131 through 133 are used as a lens means condensing laser light (light beam) after being deflected by the polygon mirror 121 and imaging the laser light onto the photoreceptor drums 31 (scanning target). However, the number of the scanning lenses should not be construed as being limited to this. One scanning lens, two scanning lenses, or four or more scanning lenses may be used as the lens means.

(5) In the above embodiments, description is provided of an exemplary structure in which the holding plate 150 is disposed on the base 103 through being supported at three positions by three protrusions or through being supported at four positions by four protrusions. However, the present invention should not be construed as being limited to this. A structure in which the holding plate 150 is supported while being spaced away from the base 103 is sufficient, and the holding plate 150 may be supported by one protrusion, two protrusions, or five or more protrusions.

Further, description is provided of an exemplary structure in which the holding plate 150 is used as a holding member for holding the scanning lenses 131 through 133, but the present invention should not be construed as being limited to this. Instead of a structure in which a scanning lens is mounted on and supported by an upper surface of a plate-like member, the present invention may have a structure in which, for example, receiving portions each receiving and holding a different one of two ends of the scanning lens in the longitudinal direction of the scanning lens are used as a holding member. When using such receiving portions, the receiving portions are fixed to protrusions at the base 103 and the scanning lens is held while being spaced away from the base 103.

(6) In the above embodiments, description is provided of an exemplary structure in which the protrusions 171 through 173 as fixing members for fixing the base 103 and the holding plate 150 while being spaced away from each other are integrally molded with the device housing 100 at the base 103. However, the present invention should not be construed as being limited to this. One or more pillar-shaped fixing member intervening between the base 103 and the holding plate 150 and connected to both the base 103 and the holding plate 150 with the scanning lenses spaced away from the base 103 are sufficient.

For example, the present invention may include a structure in which the base 103 has no protrusion and the holding plate 150 has a protrusion that is integrally molded with the holding plate 150 so as to protrude from the lower surface 152 of the holding plate 150 toward the base 103 and is fixed to the base 103 by a screw, adhesive, or the like. A portion of the base 103 that is in contact with the protrusion of the holding plate 150 is a fixed portion fixed by the fixing member.

Further, the base 103 and the holding plate 150 may both have a protrusion, and the protrusion of the base 103 and the protrusion of the holding plate 150 may be fixed to each other by adhesive or the like. Further, the present invention may also include a structure in which a member having a pillar shape such as a columnar shape or a prism shape and being independent from the base 103 and the holding plate 150 is used as a fixing member and the pillar-shaped member is connected and fixed to both the base 103 and the holding plate 150.

(7) In the above embodiments, description is provided of an exemplary structure in which the receiving portions (191*a*, 192, 193, and the like) having a protruding shape as supporting members for supporting the scanning lenses are arranged at the upper surface 151 of the holding plate 150. However, the present invention should not be construed as being limited to this. A structure including a supporting member intervening between the upper surface 151 of the holding plate 150 and a scanning lens and connecting the holding plate 150 and the scanning lens with the scanning lens spaced away from the upper surface 151 of the holding plate 150 is sufficient.

For example, the present invention may include a structure including a protrusion as a supporting member at the bottom surface of the scanning lens. In such structures, the distance La indicates a distance from a portion of the holding plate 150 at which the holding plate 150 is connected to the protrusion 171 to the protrusion (supporting member) at the scanning lens 133. Further, the supporting member (receiving portion) may be molded integrally with the holding plate 150, or may be a member independent from the holding plate 150 and the scanning lens.

Further, description is provided of an exemplary structure in which the holding plate 150 and the scanning lenses are connected only through the protruding receiving portions and the upper surface 151 of the holding plate 150 and the scanning lenses are spaced away from each other, but the present invention should not be construed as being limited to this. For example, the present invention may include a structure in which no receiving portion is included and the scanning lenses are mounted directly onto the upper surface 151 of the holding plate 150.

(8) In the above embodiments, description is provided of an exemplary structure in which the light beam scanning device is applied to a tandem-type color printer, but the present invention should not be construed as being limited to this. The present invention is applicable to any image forming device, such as a copier, a facsimile device, and a multiple function peripheral (MFP), that deflects a light beam emitted from a light source by a rotating polygon mirror and causes the light beam after deflection to be condensed onto a scanned surface of a scanning target such as a photoreceptor drum or a photoreceptor belt.

Further, any possible combinations of the above-described embodiments and the modifications are construed as being included in the scope of the present invention.

SUMMARY

The above embodiments and modifications represent one aspect for solving the problem described in "Problems to be Solved by the Invention", and are summarized as in the following.

That is, a light beam scanning device reflecting one aspect of the present invention deflecting, by using a rotating polygon mirror, a light beam emitted from a light source and condensing, by using a scanning lens, the deflected light beam onto a scanned surface, the light beam scanning device includes: a base made of a metal or a resin; a motor unit attached to the base and rotating the polygon mirror; a holding member holding the scanning lens; and one or more fixing members disposed between the base and the holding member, fixing the holding member to the base with the scanning lens spaced away from the base. In the light beam scanning device, the base has, between at least one of the fixing members and the motor unit, a penetrating hole or groove around which heat transmitted from the motor unit through the base to the fixing member passes.

In the light beam scanning device, the penetrating hole or groove may have an elongated shape in plan view of the base.

In light beam scanning device, the penetrating hole or groove may be closer to the motor unit at a center of the penetrating hole or groove in a longitudinal direction of the penetrating hole or groove than at ends of the penetrating hole or groove in the longitudinal direction of the penetrating hole or groove.

In the light beam scanning device, the motor unit may include a rotary motor, and the penetrating hole or groove may have symmetry about a virtual plane passing through a rotational axis of the rotary motor and a center of the penetrating hole or groove in a longitudinal direction of the penetrating hole or groove.

In the light beam scanning device, the penetrating hole or groove may have one of an arc shape, a square bracket shape, a C-shape, a V-shape, and a U-shape.

In the light beam scanning device, the holding member may be a plate-like member having a first main surface and a second main surface, the scanning lens may be held at the first main surface of the holding member, the second main surface of the holding member may oppose the base, and the fixing members may be disposed between the base and the second main surface of the holding member.

In the light beam scanning device, the fixing members may be two or more in number, when dividing the two or more fixing members into a first group including one or more fixing members close to the motor unit and a second group including one or more fixing members farther from the motor unit than the one or more fixing members in the first group, the base may have the penetrating hole or groove for each of the fixing members in the first group, and the base may not have the penetrating hole or groove for any of the fixing members in the second group.

In the light beam scanning device, the fixing members may be three in number, the three fixing members consisting of a first fixing member, a second fixing member, and a third fixing member, the first fixing member being the closest to the motor unit, the first fixing member may belong to the first group, and the second fixing member and the third fixing member may belong to the second group.

The light beam scanning device may further include a supporting member disposed between the scanning lens and the first main surface of the holding member and connecting the holding member and the scanning lens with the scanning lens spaced away from the first main surface of the holding member. In the light beam scanning device, La1<Lb1 and La1<Lb2 may be satisfied, where La indicates a distance along the holding member from a position at which the holding member is connected to the first fixing member to a position at which the holding member is connected to the supporting member, Lb1 indicates a distance along the holding member from a position at which the holding member is connected to the second fixing member to a position at which the holding member is connected to the supporting member, and Lb2 indicates a distance along the holding member from a position at which the holding member is connected to the third fixing member to a position at which the holding member is connected to the supporting member.

In the light beam scanning device, the fixing members may be four in number, the four fixing members consisting of a first fixing member, a second fixing member, a third fixing member, and a fourth fixing member, the first fixing member and the second fixing member being closer to the motor unit than the third fixing member and the fourth fixing member, the first fixing member and the second fixing member may belong to the first group, and the third fixing member and the fourth fixing member may belong to the second group.

The light beam scanning device may further include a supporting member disposed between the scanning lens and the first main surface of the holding member and connecting the holding member and the scanning lens with the scanning lens spaced away from the first main surface of the holding member. In the light beam scanning device, La1<Lb1, La1<Lb2, La2<Lb1, and La2<Lb2 may be satisfied, where La1 indicates a distance along the holding member from a position at which the holding member is connected to the first fixing member to a position at which the holding member is connected to the supporting member, La2 indicates a distance along the holding member from a position at which the holding member is connected to the second fixing member to a position at which the holding member is connected to the supporting member, Lb1 indicates a distance along the holding member from a position at which the holding member is connected to the third fixing member to a position at which the holding member is connected to the supporting member, and Lb2 indicates a distance along the holding member from a position at which the holding member is connected to the fourth fixing member to a position at which the holding member is connected to the supporting member.

In the light beam scanning device, the scanning lens may have an elongated shape along a main scanning direction, the fixing members may be two or more in number, and two of the two or more fixing members may have symmetry about a virtual plane that is orthogonal to the main scanning direction and that passes through a center of the scanning lens in a longitudinal direction of the scanning lens.

The light beam scanning device may further include one or more supporting members disposed between the scanning lens and the first main surface of the holding member and connecting the holding member and the scanning lens with the scanning lens spaced away from the first main surface of the holding member. In the light beam scanning device, the scanning lens may have an elongated shape along a main scanning direction, the fixing members may be two or more in number, and two of the two or more fixing members may have symmetry about a virtual plane that is orthogonal to the main scanning direction and that passes through a center of the scanning lens in a longitudinal direction of the scanning lens, when the light beam scanning device includes one supporting member, the one supporting member may be at a position passing through the virtual plane, and when the light beam scanning device includes two or more supporting members, two of the two or more supporting members may have symmetry about the virtual plane.

In the light beam scanning device, the fixing members may have a columnar shape, the penetrating hole or groove may have an arc shape in plan view of the base, and for each pair of a columnar-shaped fixing member and the penetrating hole or groove, a center of the penetrating hole or groove may be at a central axis of the columnar-shaped fixing member.

In the light beam scanning device, the base may have a plate-like shape having a first surface that is a main surface at which the fixing members are connected and a second surface that is a main surface opposite the first main surface, and the base may have, for at least one of the fixing members, a heat sink corresponding to the fixing member at a region of the second surface of the base opposing the fixing member across the base.

In the light beam scanning device, the heat sink may have a plurality of heat dissipation fins that are parallel with each other.

In the light beam scanning device, the motor unit may include a rotary motor, the penetrating hole or groove may have an elongated shape in plan view of the base, the fixing members may include a specific fixing member, the base may have both the penetrating hole or groove and the heat sink for the specific fixing member, and the heat sink for the specific fixing member may include a plurality of heat dissipation fins that are parallel with a virtual plane passing through a rotational axis of the rotary motor and through a center of the penetrating hole or groove for the specific fixing member in a longitudinal direction of the penetrating hole or groove for the specific fixing member.

In the light beam scanning device, when the heat sink includes heat dissipation fins of an even number, the heat dissipation fins may be divided into two groups sandwiching the virtual plane and each including the same number of heat dissipation fins, the heat dissipation fins in a first group arranged at one side of the virtual plane and the heat dissipation fins in a second group arranged at the other side of the virtual plane are numbered from the heat dissipation fins closest to the virtual plane, each pair of one of the heat dissipation fins in the first group and one of the heat dissipation fins in the second group that are assigned with the same number may be arranged such that the one of the heat dissipation fins in the first group and the one of the heat dissipation fins in the second group are spaced away from the virtual plane at the same distance, and when heat dissipation fins of an odd number are included, one heat dissipation fin may be arranged on the virtual plane, and other heat dissipation fins may be divided into two groups sandwiching the virtual plane and each including the same number of heat dissipation fins, the heat dissipation fins in a first group arranged at one side of the virtual plane and the heat dissipation fins in a second group arranged at the other side of the virtual plane are numbered from the heat dissipation fins closest to the virtual plane, each pair of one of the heat dissipation fins in the first group and one of the heat dissipation fins in the second group that are assigned with the same number may be arranged such that the one of the heat dissipation fins in the first group and the one of the heat dissipation fins in the second group are spaced away from the virtual plane at the same distance.

In the light beam scanning device, the penetrating hole or groove for the specific fixing member may be a penetrating hole, in plan view of the base, the penetrating hole for the specific fixing member may have symmetry about the virtual plane and has one of an arc shape, a square bracket shape, a C-shape, a V-shape, and a U-shape, and assuming that: (i) a contour portion of the penetrating hole for the specific fixing member that is closer to the motor unit in a contour of the penetrating hole for the specific fixing member and has one of an arc shape, a square bracket shape, a C-shape, a V-shape, and a U-shape is an outer contour portion, (ii) a contour portion of the penetrating hole for the specific fixing member that is farther from the motor unit in the contour of the penetrating hole for the specific fixing member and has one of an arc shape, a square bracket shape, a C-shape, a V-shape, and a U-shape is an inner contour portion, (iii) a region on the base surrounded by the inner contour portion and a line segment connecting one end of the inner contour portion and the other end of the inner contour portion is as a penetrating hole surrounding region, and (iv) a region on the base that is outwards from the penetrating hole surrounding region and adjacent to the penetrating hole surrounding region is an outward region, at least one of the plurality of heat dissipation fins that correspond to the specific fixing member may span over the penetrating hole surrounding region and the outward region.

An image forming device reflecting another aspect of the present invention forms a latent image on a photoreceptor through scanning the photoreceptor by using a light beam from a light beam scanning unit and developing the latent image. In the image forming device, the light beam scanning unit is a light beam scanning device deflecting, by using a rotating polygon mirror, a light beam emitted from a light source and condensing, by using a scanning lens, the deflected light beam onto a scanned surface, the light beam scanning device comprising: a base made of a metal or a resin; a motor unit attached to the base and rotating the polygon mirror; a holding member holding the scanning lens; and one or more fixing members disposed between the base and the holding member, fixing the holding member to the base with the scanning lens spaced away from the base, wherein the base has, between at least one of the fixing members and the motor unit, a penetrating hole or groove around which heat transmitted from the motor unit through the base to the fixing member passes.

In the above-described structure, heat from the motor unit is transmitted from the base made of a metal or a resin through the fixing member and the holding member to the scanning lens even when a great amount of heat is discharged from the motor unit due to high-speed rotation of the polygon mirror. Accordingly, heat amount transmitted to the scanning lens is smaller than in a structure in which the scanning lens is mounted directly on the base. Further, heat discharged from the motor unit is transmitted through the base, passes around the through-hole or the groove, and reaches the fixing member. Due to this, the present invention has a longer heat transmission path than a structure having no through-hole or groove. The present invention thus promotes heat dissipation and reduces a heat amount transmitted to the fixing member. Such reduction of the heat amount transmitted to the fixing member achieves suppression of thermal deformation of the scanning lens.

Although one or more embodiments of the present invention have been described and illustrated in detail, it is clearly understood that the same is by way of illustration and example only and not limitation; the scope of the present invention should be interpreted by terms of the appended claims.

What is claimed is:

1. A light beam scanning device deflecting, by using a rotating polygon mirror, a light beam emitted from a light source and condensing, by using a scanning lens, the deflected light beam onto a scanned surface, the light beam scanning device comprising:
a base made of a metal or a resin;
a motor unit attached to the base and rotating the polygon mirror;
a holding member holding the scanning lens; and
at least one fixing member disposed on a main surface of the base between the base and the holding member and having a central longitudinal axis perpendicular to the main surface of the base, the at least one fixing member fixing the holding member to the base with the holding member spaced away from the main surface of the base, wherein
the base has, between the at least one fixing member and the motor unit, a penetrating hole or groove around which heat transmitted from the motor unit through the base to the at least one fixing member passes, wherein the penetrating hole or groove has a length greater than a width, and the penetrating hole or groove is intersected at a center thereof along the length by a first virtual plane passing through a rotational axis of the motor unit and the central longitudinal axis of the at least one fixing member.

2. The light beam scanning device of claim 1, wherein the penetrating hole or groove has an elongated shape in plan view of the base.

3. The light beam scanning device of claim 2, wherein the penetrating hole or groove is closer to the motor unit at a center of the penetrating hole or groove in a longitudinal direction of the penetrating hole or groove than at ends of the penetrating hole or groove in the longitudinal direction of the penetrating hole or groove.

4. The light beam scanning device of claim 2, wherein the motor unit includes a rotary motor, and
the penetrating hole or groove has symmetry about the first virtual plane passing through the rotational axis of the rotary motor and the center of the penetrating hole or groove in a longitudinal direction of the penetrating hole or groove.

5. The light beam scanning device of claim 1, wherein the penetrating hole or groove has one of an arc shape, a square bracket shape, a C-shape, a V-shape, and a U-shape.

6. The light beam scanning device of claim 1, wherein the holding member is a plate-like member having a first main surface and a second main surface,
the scanning lens is held at the first main surface of the holding member,
the second main surface of the holding member opposes the base, and
the at least one fixing member is disposed between the base and the second main surface of the holding member.

7. The light beam scanning device of claim 6, wherein the at least one fixing member includes at least two fixing members,
when dividing the at least two fixing members into a first group including one or more fixing members close to the motor unit and a second group including one or more fixing members farther from the motor unit than the one or more fixing members in the first group,
the base has the penetrating hole or groove for each of the fixing members in the first group, and
the base does not have the penetrating hole or groove for any of the fixing members in the second group.

8. The light beam scanning device of claim 7, wherein the at least one fixing member includes three fixing members, the three fixing members consisting of a first fixing member, a second fixing member, and a third fixing member, the first fixing member being the closest to the motor unit, the first fixing member belongs to the first group, and the second fixing member and the third fixing member belong to the second group.

9. The light beam scanning device of claim 8 further comprising a supporting member disposed between the scanning lens and the first main surface of the holding member and connecting the holding member and the scanning lens with the scanning lens spaced away from the first main surface of the holding member, wherein La<Lb1 and La<Lb2 are satisfied, where La indicates a distance along the holding member from a position at which the holding member is connected to the first fixing member to a position at which the holding member is connected to the supporting member, Lb1 indicates a distance along the holding member from a position at which the holding member is connected to the second fixing member to a position at which the holding member is connected to the supporting member, and Lb2 indicates a distance along the holding member from a position at which the holding member is connected to the third fixing member to a position at which the holding member is connected to the supporting member.

10. The light beam scanning device of claim 7, wherein the at least one fixing member includes four fixing members, the four fixing members consisting of a first fixing member, a second fixing member, a third fixing member, and a fourth fixing member, the first fixing member and the second fixing member being closer to the motor unit than the third fixing member and the fourth fixing member, the first fixing member and the second fixing member belong to the first group, and the third fixing member and the fourth fixing member belong to the second group.

11. The light beam scanning device of claim 10 further comprising a supporting member disposed between the scanning lens and the first main surface of the holding member and connecting the holding member and the scanning lens with the scanning lens spaced away from the first main surface of the holding member, wherein La1<Lb1, La1<Lb2, La2<Lb1, and La2<Lb2 are satisfied, where La1 indicates a distance along the holding member from a position at which the holding member is connected to the first fixing member to a position at which the holding member is connected to the supporting member, La2 indicates a distance along the holding member from a position at which the holding member is connected to the second fixing member to a position at which the holding member is connected to the supporting member, Lb1 indicates a distance along the holding member from a position at which the holding member is connected to the third fixing member to a position at which the holding member is connected to the supporting member, and Lb2 indicates a distance along the holding member from a position at which the holding member is connected to the fourth fixing member to a position at which the holding member is connected to the supporting member.

12. The light beam scanning device of claim 6, wherein the scanning lens has an elongated shape along a main scanning direction, the at least one fixing member includes at least two fixing members, and two of the at least two fixing members have symmetry about a second virtual plane that is orthogonal to the main scanning direction and that passes through a center of the scanning lens in a longitudinal direction of the scanning lens.

13. The light beam scanning device of claim 6 further comprising one or more supporting members disposed between the scanning lens and the first main surface of the holding member and connecting the holding member and the scanning lens with the scanning lens spaced away from the first main surface of the holding member, wherein the scanning lens has an elongated shape along a main scanning direction, the at least one fixing member includes at least two fixing members, and two of the at least two fixing members have symmetry about a second virtual plane that is orthogonal to the main scanning direction and that passes through a center of the scanning lens in a longitudinal direction of the scanning lens, when the light beam scanning device includes one supporting member, the one supporting member is at a position passing through the second virtual plane, and when the light beam scanning device includes two or more supporting members, two of the two or more supporting members have symmetry about the second virtual plane.

14. The light beam scanning device of claim 1, wherein the at least one fixing member has a columnar shape, the penetrating hole or groove has an arc shape in plan view of the base, and for each pair of a columnar-shaped fixing member and the penetrating hole or groove, the center of the penetrating hole or groove is at a central axis of the columnar-shaped fixing member.

15. The light beam scanning device of claim 1, wherein the base has a plate-like shape having a first surface that is the main surface at which the at least one fixing member is connected and a second surface that is opposite the first surface, and the base has, for the at least one fixing member, a heat sink corresponding to the at least one fixing member at a region of the second surface of the base opposing the at least one fixing member across the base.

16. The light beam scanning device of claim 15, wherein the heat sink has a plurality of heat dissipation fins that are parallel with each other.

17. The light beam scanning device of claim 16, wherein the motor unit includes a rotary motor, the penetrating hole or groove has an elongated shape in plan view of the base, the at least one fixing member includes a specific fixing member, the base has both the penetrating hole or groove and the heat sink for the specific fixing member, and the heat sink for the specific fixing member includes a plurality of heat dissipation fins that are parallel with the first virtual plane passing through the rotational axis of the rotary motor and through the center of the penetrating hole or groove for the specific fixing member in the longitudinal direction of the penetrating hole or groove for the specific fixing member.

18. The light beam scanning device of claim 17, wherein when the heat sink includes heat dissipation fins of an even number, the heat dissipation fins are divided into two groups sandwiching the first virtual plane and each including the same number of heat dissipation fins, the heat dissipation fins in a first group arranged at one side of the first virtual plane and the heat dissipation fins in a second group arranged at the other side of the first virtual plane are numbered from the heat dissipation fins closest to the first virtual plane, each pair of one of the heat dissipation fins in the first group and one of the heat dissipation fins in the second group that are assigned with the same number is arranged such that the one of the heat dissipation fins in the first group and the one of the heat dissipation fins in the second group are spaced away from the first virtual plane at the same distance, and when heat dissipation fins of an odd number are included, one heat dissipation fin is arranged on the first virtual plane, and other heat dissipation fins are divided into two groups sandwiching the first virtual plane and each including the same number of heat dissipation fins, the heat dissipation fins in a first group arranged at one side of the first virtual plane and the heat dissipation fins in a second group arranged at the other side of the first virtual plane are numbered from the heat dissipation fins closest to the first virtual plane, each pair of one of the heat dissipation fins in the first group and one of the heat dissipation fins in the second group that are assigned with the same number is arranged such that the one of the heat dissipation fins in the first group and the one of the heat dissipation fins in the second group are spaced away from the first virtual plane at the same distance.

19. The light beam scanning device of claim 17, wherein the penetrating hole or groove for the specific fixing member is a penetrating hole, in plan view of the base, the penetrating hole for the specific fixing member has symmetry about the first virtual plane and has one of an arc shape, a square bracket shape, a C-shape, a V-shape, and a U-shape, and assuming that:
(i) a contour portion of the penetrating hole for the specific fixing member that is closer to the motor unit in a contour of the penetrating hole for the specific fixing member and has one of an arc shape, a square bracket shape, a C-shape, a V-shape, and a U-shape is an outer contour portion,
(ii) a contour portion of the penetrating hole for the specific fixing member that is farther from the motor unit in the contour of the penetrating hole for the specific fixing member and has one of an arc shape, a square bracket shape, a C-shape, a V-shape, and a U-shape is an inner contour portion,
(iii) a region on the base surrounded by the inner contour portion and a line segment connecting one end of the inner contour portion and the other end of the inner contour portion is as a penetrating hole surrounding region, and
(iv) a region on the base that is outwards from the penetrating hole surrounding region and adjacent to the penetrating hole surrounding region is an outward region, at least one of the plurality of heat dissipation fins that correspond to the specific fixing member spans over the penetrating hole surrounding region and the outward region.

20. An image forming device forming a latent image on a photoreceptor through scanning the photoreceptor by using a light beam from a light beam scanning unit and developing the latent image, wherein the light beam scanning unit is a light beam scanning device deflecting, by using a rotating polygon mirror, a light beam emitted from a light source and condensing, by using a scanning lens, the deflected light beam onto a scanned surface, the light beam scanning device comprising:
a base made of a metal or a resin;
a motor unit attached to the base and rotating the polygon mirror;
a holding member holding the scanning lens; and
a fixing member disposed on a main surface of the base between the base and the holding member and having a longitudinal axis perpendicular to the main surface of the base, the fixing member fixing the holding member to the base with the holding member spaced away from the main surface of the base, wherein the base has, between the fixing member and the motor unit, a penetrating hole or groove around which heat transmitted from the motor unit through the base to the fixing member passes, wherein the penetrating hole or groove has a length greater than a width, and the penetrating hole or groove is intersected at a center thereof along the length by a plane passing through a rotational axis of the motor unit and the longitudinal axis of the at least one fixing member.

* * * * *